US008138234B2

(12) United States Patent
Brown

(10) Patent No.: US 8,138,234 B2
(45) Date of Patent: *Mar. 20, 2012

(54) POLYURETHANE COMPOSITE MATERIALS

(75) Inventor: Wade H. Brown, San Antonio, TX (US)

(73) Assignee: Century-Board USA, LLC, San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 11/691,451

(22) Filed: Mar. 26, 2007

(65) Prior Publication Data
US 2007/0225391 A1   Sep. 27, 2007

Related U.S. Application Data

(60) Provisional application No. 60/785,726, filed on Mar. 24, 2006, provisional application No. 60/785,749, filed on Mar. 24, 2006.

(51) Int. Cl.
C08J 9/00 (2006.01)
C08J 9/10 (2006.01)
C08G 59/00 (2006.01)

(52) U.S. Cl. .............. 521/91; 521/92; 521/80; 521/172

(58) Field of Classification Search .................. 521/170, 521/172, 174, 122, 91, 92, 80
See application file for complete search history.

(56) References Cited

U.S. PATENT DOCUMENTS

| | | |
|---|---|---|
| 529,535 A | 11/1894 | Smith |
| 529,538 A | 11/1894 | Vaughn |
| 2,526,033 A | 10/1950 | Lyon |
| 2,817,875 A | 12/1957 | Harris et al. |
| 2,983,693 A | 5/1961 | Sievers |
| 3,065,500 A | 11/1962 | Berner |
| 3,071,297 A | 1/1963 | Lee |
| 3,078,512 A | 2/1963 | De Haven |
| 3,223,027 A | 12/1965 | Soda et al. |
| 3,262,151 A | 7/1966 | Oxel |
| 3,269,961 A | 8/1966 | Bruson et al. |
| 3,308,218 A | 3/1967 | Wiegand et al. |
| 3,466,705 A | 9/1969 | Richie |
| 3,528,126 A | 9/1970 | Ernst et al. |
| 3,566,448 A | 3/1971 | Ernst |
| 3,644,168 A | 2/1972 | Bonk et al. |
| 3,698,731 A | 10/1972 | Jost et al. |
| 3,726,624 A | 4/1973 | Schwarz |
| 3,736,081 A | 5/1973 | Yovanovich |
| 3,738,895 A | 6/1973 | Paymal |
| 3,764,247 A | 10/1973 | Garrett et al. |
| 3,768,937 A | 10/1973 | Haga et al. |
| 3,774,428 A | 11/1973 | Derry et al. |
| 3,802,582 A | 4/1974 | Brock |
| 3,816,043 A | 6/1974 | Snelling et al. |
| 3,819,574 A | 6/1974 | Brown et al. |
| 3,824,057 A | 7/1974 | Kornylak et al. |
| 3,830,776 A | 8/1974 | Carlson et al. |
| 3,832,429 A | 8/1974 | Charpentier |
| 3,841,390 A | 10/1974 | DiBenedetto et al. |
| 3,843,757 A | 10/1974 | Ehrenfreund et al. |
| 3,852,387 A | 12/1974 | Bortnick et al. |
| 3,867,494 A | 2/1975 | Rood et al. |
| 3,878,027 A | 4/1975 | Troutner |
| 3,890,077 A | 6/1975 | Holman |
| 3,910,179 A | 10/1975 | Troutner |
| 3,917,547 A | 11/1975 | Massey |
| 3,917,774 A | 11/1975 | Sagane et al. |
| 3,928,258 A * | 12/1975 | Alexander .................... 521/131 |
| 3,963,679 A | 6/1976 | Ullrich et al. |
| 3,981,654 A | 9/1976 | Rood et al. |
| 3,991,005 A | 11/1976 | Wallace |
| 3,999,230 A | 12/1976 | Bruning et al. |
| 4,005,035 A | 1/1977 | Deaver |
| 4,042,314 A | 8/1977 | Bruning et al. |
| 4,051,742 A | 10/1977 | Johansson et al. |
| 4,060,579 A | 11/1977 | Schmitzer et al. |
| 4,065,410 A | 12/1977 | Schäfer et al. |
| 4,073,840 A | 2/1978 | Saidla |
| 4,078,032 A | 3/1978 | Wenner |
| 4,092,276 A | 5/1978 | Narayan |

(Continued)

FOREIGN PATENT DOCUMENTS

CA   2 037 130 C   1/2006

(Continued)

OTHER PUBLICATIONS

Tenibac-Graphion, Inc., Texturing Technologists, Brochure, Oct. 1, 1997.
Bayer AG, Bayferrox Iron Oxide Pigments: Manufacturing, Properties and Application Recommendations.
Krishnamurthi, B, et al.., Nano- and Micro-Fillers for Polyurethane Foams: Effect on Density and Mechanical Properties, Symposium, Sep. 30-Oct. 3, 2001, pp. 239-244, Polyurethanes Expo 2001, Columbus, OH.
Nosker, Thomas J., et al., Fiber Orientation and Creation of Structural Plastic Lumber, Plastics Engineering, Jun. 1999, pp. 53-56.
Bledzki, Andrzej K., et al., Impact Properties of Natural Fiber-Reinforced Epoxy Foams, Journal of Cellular Plastics, vol. 35, Nov. 1999, pp. 550-562.
Frisch, K.C., et al., Hybrid IPN-Foam Composites, Cellular Polymers, Papers from a Three-day International Conference organized by Rapra Technology Limited, Mar. 20-22, 1991.
Shutov, F.A., Excerpts from Integral/Structural Polymer Foams: Technology, Properties and Applications, 1986, pp. including preface, 3-4, 8-9, 13, 23-25, 131-134, 153-158, 167, 171, 176-179, 256.
Klempner, D., ed., et al., Excerpts from Handbook of Polymeric Foams and Foam Technology, 2d ed., 2004, pp. 121-124, 126, 128, 129, Hanser Publishers, Munich.

(Continued)

Primary Examiner — Liam Heincer
(74) Attorney, Agent, or Firm — Knobbe, Martens, Olson & Bear, LLP

(57) ABSTRACT

Polymeric composite materials, particularly highly filled polyurethane composite materials are described herein. Such highly filled polyurethane composite materials may be formed by reaction and extrusion of one or more polyols, one or more di- or poly-isocyanates, and from about 45 to about 85 weight percent of inorganic filler such as fly ash. Certain polyols, including plant-based polyols can be used. Certain composite materials also contain chain extenders and/or crosslinkers. The polyurethane composite material may also contain fibers such as chopped or axial fibers which further provide good mechanical properties to the composite material. Shaped articles containing the polyurethane composite material have been found to have good mechanical properties, such that the shaped articles are suitable for building applications.

11 Claims, No Drawings

U.S. PATENT DOCUMENTS

| | | |
|---|---|---|
| 4,104,094 A | 8/1978 | Peterson |
| 4,107,248 A | 8/1978 | Schlieckmann |
| 4,120,626 A | 10/1978 | Keller |
| 4,127,040 A | 11/1978 | Moore et al. |
| 4,128,369 A | 12/1978 | Kemerer |
| 4,137,200 A * | 1/1979 | Wood et al. .................. 521/159 |
| 4,141,862 A | 2/1979 | Raden et al. |
| 4,143,759 A | 3/1979 | Paradis |
| 4,149,840 A | 4/1979 | Tippmann |
| 4,153,768 A | 5/1979 | Blount |
| 4,160,749 A | 7/1979 | Schneider et al. |
| 4,163,824 A | 8/1979 | Saidla |
| 4,164,439 A | 8/1979 | Coonrod |
| 4,164,526 A | 8/1979 | Clay et al. |
| 4,165,414 A | 8/1979 | Narayan et al. |
| 4,180,538 A | 12/1979 | Morikawa et al. |
| 4,209,605 A | 6/1980 | Hoy et al. |
| 4,210,572 A | 7/1980 | Herman et al. |
| 4,214,864 A | 7/1980 | Tabler |
| 4,221,877 A | 9/1980 | Cuscurida et al. |
| 4,243,755 A | 1/1981 | Marx et al. |
| 4,247,656 A | 1/1981 | Janssen |
| 4,248,975 A | 2/1981 | Satterly |
| 4,251,428 A | 2/1981 | Recker Klaus et al. |
| 4,254,002 A | 3/1981 | Sperling et al. |
| 4,254,176 A | 3/1981 | Müller et al. |
| 4,256,846 A | 3/1981 | Ohashi et al. |
| 4,260,538 A | 4/1981 | Iseler et al. |
| 4,261,946 A | 4/1981 | Goyert et al. |
| 4,272,377 A | 6/1981 | Gerlach et al. |
| 4,275,033 A | 6/1981 | Schulte et al. |
| 4,276,337 A | 6/1981 | Coonrod |
| 4,282,988 A | 8/1981 | Hulber, Jr. |
| 4,290,248 A | 9/1981 | Kemerer et al. |
| 4,300,776 A | 11/1981 | Taubenmann |
| 4,330,494 A | 5/1982 | Iwata et al. |
| 4,331,726 A | 5/1982 | Cleary |
| 4,338,422 A | 7/1982 | Jackson, Jr. et al. |
| 4,339,366 A | 7/1982 | Blount |
| 4,342,847 A | 8/1982 | Goyert et al. |
| 4,344,873 A | 8/1982 | Wick |
| 4,347,281 A | 8/1982 | Futcher et al. |
| 4,359,359 A | 11/1982 | Gerlach et al. |
| 4,359,548 A | 11/1982 | Blount |
| 4,366,204 A | 12/1982 | Briggs |
| 4,367,259 A | 1/1983 | Fulmer et al. |
| 4,376,171 A | 3/1983 | Blount |
| 4,381,352 A | 4/1983 | McBrayer |
| 4,382,056 A | 5/1983 | Coonrod |
| 4,383,818 A | 5/1983 | Swannell |
| 4,390,581 A | 6/1983 | Cogswell et al. |
| 4,395,214 A | 7/1983 | Phipps et al. |
| 4,396,791 A | 8/1983 | Mazzoni |
| 4,397,983 A | 8/1983 | Hill et al. |
| 4,412,033 A | 10/1983 | LaBelle et al. |
| 4,439,548 A | 3/1984 | Weisman |
| 4,450,133 A | 5/1984 | Cafarelli |
| 4,460,737 A | 7/1984 | Evans et al. |
| 4,465,500 A | 8/1984 | Motsinger et al. |
| 4,483,727 A | 11/1984 | Eickman et al. |
| 4,489,023 A | 12/1984 | Proksa |
| 4,512,942 A | 4/1985 | Babbin et al. |
| 4,514,162 A | 4/1985 | Schulz |
| 4,532,098 A | 7/1985 | Campbell et al. |
| 4,540,357 A | 9/1985 | Campbell et al. |
| 4,568,702 A | 2/1986 | Mascioli |
| 4,576,718 A | 3/1986 | Reischl et al. |
| 4,581,186 A | 4/1986 | Larson |
| 4,595,709 A | 6/1986 | Reischl |
| 4,597,927 A | 7/1986 | Zeitler et al. |
| 4,600,311 A | 7/1986 | Mourrier |
| 4,604,410 A | 8/1986 | Altenberg |
| 4,649,162 A | 3/1987 | Roche et al. |
| 4,661,533 A | 4/1987 | Stobby |
| 4,677,157 A | 6/1987 | Jacobs |
| 4,680,214 A | 7/1987 | Frisch et al. |
| 4,714,778 A | 12/1987 | Burgoyne, Jr. et al. |
| 4,717,027 A | 1/1988 | Laure et al. |
| 4,780,484 A | 10/1988 | Schubert et al. |
| 4,780,498 A | 10/1988 | Goerrissen et al. |
| 4,795,763 A | 1/1989 | Gluck et al. |
| 4,802,769 A | 2/1989 | Tanaka |
| 4,826,944 A | 5/1989 | Hoefer et al. |
| 4,832,183 A | 5/1989 | Lapeyre |
| 4,835,195 A | 5/1989 | Rayfield et al. |
| 4,855,184 A | 8/1989 | Klun et al. |
| 4,892,891 A | 1/1990 | Close |
| 4,895,352 A | 1/1990 | Stumpf |
| 4,948,859 A | 8/1990 | Echols et al. |
| 4,995,801 A | 2/1991 | Hehl |
| 5,001,165 A | 3/1991 | Canaday et al. |
| 5,010,112 A | 4/1991 | Glicksman et al. |
| 5,028,648 A | 7/1991 | Famili et al. |
| 5,051,222 A | 9/1991 | Marten et al. |
| 5,053,274 A | 10/1991 | Jonas |
| 5,091,436 A | 2/1992 | Frisch et al. |
| 5,094,798 A | 3/1992 | Hewitt |
| 5,096,993 A | 3/1992 | Smith et al. |
| 5,102,918 A | 4/1992 | Moriya |
| 5,102,969 A | 4/1992 | Scheffler et al. |
| 5,114,630 A | 5/1992 | Newman et al. |
| 5,149,722 A | 9/1992 | Soukup |
| 5,149,739 A | 9/1992 | Lee |
| 5,159,012 A | 10/1992 | Doesburg et al. |
| 5,166,301 A | 11/1992 | Jacobs |
| 5,167,899 A | 12/1992 | Jezic |
| 5,185,420 A | 2/1993 | Smith et al. |
| 5,229,138 A | 7/1993 | Carotti |
| 5,252,697 A | 10/1993 | Jacobs et al. |
| 5,271,699 A | 12/1993 | Barre et al. |
| 5,296,545 A | 3/1994 | Heise |
| 5,300,531 A | 4/1994 | Weaver |
| 5,302,634 A | 4/1994 | Mushovic |
| 5,330,341 A | 7/1994 | Kemerer et al. |
| 5,331,044 A | 7/1994 | Lausberg et al. |
| 5,340,300 A | 8/1994 | Saeki et al. |
| 5,344,490 A | 9/1994 | Roosen et al. |
| 5,361,945 A | 11/1994 | Johanson |
| 5,369,147 A | 11/1994 | Mushovic |
| 5,375,988 A | 12/1994 | Klahre |
| 5,424,013 A | 6/1995 | Lieberman |
| 5,424,014 A | 6/1995 | Glorioso et al. |
| 5,432,204 A | 7/1995 | Farkas |
| 5,439,711 A | 8/1995 | Vu et al. |
| 5,453,231 A | 9/1995 | Douglas |
| 5,455,312 A | 10/1995 | Heidingsfeld et al. |
| 5,458,477 A | 10/1995 | Kemerer et al. |
| 5,491,174 A | 2/1996 | Grier et al. |
| 5,495,640 A | 3/1996 | Mullet et al. |
| 5,505,599 A | 4/1996 | Kemerer et al. |
| 5,508,315 A | 4/1996 | Mushovic |
| 5,522,446 A | 6/1996 | Mullet et al. |
| 5,527,172 A | 6/1996 | Graham, Jr. |
| 5,532,065 A | 7/1996 | Gübitz et al. |
| 5,536,781 A | 7/1996 | Heidingsfeld et al. |
| 5,554,713 A | 9/1996 | Freeland |
| 5,562,141 A | 10/1996 | Mullet et al. |
| 5,565,497 A | 10/1996 | Godbey et al. |
| 5,566,740 A | 10/1996 | Mullet et al. |
| 5,567,791 A | 10/1996 | Brauer et al. |
| 5,569,713 A | 10/1996 | Lieberman |
| 5,582,840 A | 12/1996 | Pauw et al. |
| 5,582,849 A | 12/1996 | Lupke |
| 5,604,266 A | 2/1997 | Mushovic |
| 5,611,976 A | 3/1997 | Klier et al. |
| 5,621,024 A | 4/1997 | Eberhardt et al. |
| 5,631,103 A | 5/1997 | Eschbach et al. |
| 5,631,319 A | 5/1997 | Reese et al. |
| 5,643,516 A | 7/1997 | Raza et al. |
| 5,681,915 A | 10/1997 | Lechner et al. |
| 5,688,890 A | 11/1997 | Ishiguro et al. |
| 5,696,205 A | 12/1997 | Müller et al. |
| 5,700,495 A | 12/1997 | Kemerer et al. |
| 5,723,506 A | 3/1998 | Glorioso et al. |
| 5,728,337 A | 3/1998 | Yoshikawa et al. |
| 5,759,695 A | 6/1998 | Primeaux, II |
| 5,760,133 A | 6/1998 | Heidingsfeld et al. |

| | | | | | | |
|---|---|---|---|---|---|---|
| 5,782,283 A | 7/1998 | Kendall | 6,613,827 B2 | 9/2003 | Lundgard et al. | |
| 5,783,125 A | 7/1998 | Bastone et al. | 6,616,886 B2 | 9/2003 | Peterson et al. | |
| 5,783,629 A | 7/1998 | Srinivasan et al. | 6,617,009 B1 | 9/2003 | Chen et al. | |
| 5,795,949 A | 8/1998 | Daute et al. | 6,624,244 B2 | 9/2003 | Kurth | |
| 5,811,506 A | 9/1998 | Slagel | 6,641,384 B2 | 11/2003 | Bosler et al. | |
| 5,817,402 A | 10/1998 | Miyake et al. | 6,649,084 B2 | 11/2003 | Morikawa et al. | |
| 5,836,499 A | 11/1998 | Mullet et al. | 6,649,667 B2 | 11/2003 | Clatty | |
| 5,844,015 A | 12/1998 | Steilen et al. | 6,686,435 B1 | 2/2004 | Petrovic et al. | |
| 5,908,701 A | 6/1999 | Jennings et al. | 6,695,902 B2 | 2/2004 | Hemmings et al. | |
| 5,929,153 A | 7/1999 | Mori et al. | 6,706,774 B2 | 3/2004 | Münzenberger et al. | |
| 5,934,352 A | 8/1999 | Morgan | 6,767,399 B2 | 7/2004 | Peev et al. | |
| 5,945,460 A | 8/1999 | Ekart et al. | 6,769,220 B2 | 8/2004 | Friesner | |
| 5,952,053 A | 9/1999 | Colby | 6,832,430 B1 | 12/2004 | Ogawa et al. | |
| 5,962,144 A | 10/1999 | Primeaux, II | 6,849,676 B1 | 2/2005 | Shibano et al. | |
| 5,981,655 A | 11/1999 | Heidingsfeld et al. | 6,864,296 B2 | 3/2005 | Kurth | |
| 6,000,102 A | 12/1999 | Lychou | 6,867,239 B2 | 3/2005 | Kurth | |
| 6,019,269 A | 2/2000 | Mullet et al. | 6,871,457 B2 | 3/2005 | Quintero-Flores et al. | |
| 6,020,387 A | 2/2000 | Downey et al. | 6,881,763 B2 | 4/2005 | Kurth | |
| 6,040,381 A | 3/2000 | Jennings et al. | 6,881,764 B2 | 4/2005 | Doesburg et al. | |
| 6,051,634 A | 4/2000 | Laas et al. | 6,903,156 B2 | 6/2005 | Müller et al. | |
| 6,055,781 A | 5/2000 | Johanson | 6,908,573 B2 | 6/2005 | Hossan | |
| 6,062,719 A | 5/2000 | Busby et al. | 6,916,863 B2 | 7/2005 | Hemmings et al. | |
| 6,086,802 A | 7/2000 | Levera et al. | 6,962,636 B2 | 11/2005 | Kurth et al. | |
| 6,096,401 A | 8/2000 | Jenkines | 6,971,495 B2 | 12/2005 | Hedrick et al. | |
| 6,103,340 A | 8/2000 | Kubo et al. | 6,979,477 B2 | 12/2005 | Kurth et al. | |
| 6,107,355 A | 8/2000 | Horn et al. | 6,979,704 B1 | 12/2005 | Mayer et al. | |
| 6,107,433 A | 8/2000 | Petrovic et al. | 6,989,123 B2 | 1/2006 | Lee et al. | |
| 6,120,905 A | 9/2000 | Flvovsky | 6,997,346 B2 | 2/2006 | Landers et al. | |
| 6,136,246 A | 10/2000 | Rauwendaal et al. | 7,063,877 B2 | 6/2006 | Kurth et al. | |
| 6,136,870 A | 10/2000 | Triolo et al. | 7,132,459 B2 | 11/2006 | Buchel | |
| 6,140,381 A | 10/2000 | Rosthauser et al. | 7,160,976 B2 | 1/2007 | Lühmann et al. | |
| 6,177,232 B1 | 1/2001 | Melisaris et al. | 7,188,992 B2 | 3/2007 | Mattingly, Jr. | |
| 6,180,192 B1 | 1/2001 | Smith et al. | 7,196,124 B2 | 3/2007 | Parker et al. | |
| 6,180,686 B1 | 1/2001 | Kurth | 7,211,206 B2 | 5/2007 | Brown et al | |
| RE37,095 E | 3/2001 | Glorioso et al. | 7,267,288 B2 | 9/2007 | Wheeler, Jr. et al. | |
| 6,204,312 B1 | 3/2001 | Taylor | 7,316,559 B2 | 1/2008 | Taylor | |
| 6,211,259 B1 | 4/2001 | Borden et al. | 7,491,351 B2 | 2/2009 | Taylor et al. | |
| 6,224,797 B1 | 5/2001 | Franzen et al. | 7,651,645 B2 | 1/2010 | Taylor | |
| 6,234,777 B1 | 5/2001 | Sperry et al. | 7,794,817 B2 | 9/2010 | Brown | |
| 6,252,031 B1 | 6/2001 | Tsutsumi et al. | 2001/0009683 A1 | 7/2001 | Kitahama et al. | |
| 6,257,643 B1 | 7/2001 | Young | 2002/0034598 A1 | 3/2002 | Bonk et al. | |
| 6,257,644 B1 | 7/2001 | Young | 2002/0040071 A1 | 4/2002 | Lin et al. | |
| 6,258,310 B1 | 7/2001 | Sardanopoli et al. | 2002/0045048 A1 | 4/2002 | Bonk et al. | |
| 6,258,917 B1 | 7/2001 | Slagel | 2002/0048643 A1 | 4/2002 | Bonk et al. | |
| 6,264,462 B1 | 7/2001 | Gallagher | 2002/0086913 A1* | 7/2002 | Roels et al. | 521/155 |
| 6,284,841 B1 | 9/2001 | Friesner | 2002/0098362 A1* | 7/2002 | Mushovic | 428/413 |
| 6,294,637 B1 | 9/2001 | Braüer et al. | 2002/0171164 A1 | 11/2002 | Halterbaum et al. | |
| 6,297,321 B1 | 10/2001 | Onder et al. | 2002/0192456 A1 | 12/2002 | Mashburn et al. | |
| 6,309,507 B1 | 10/2001 | Morikawa et al. | 2003/0004232 A1 | 1/2003 | Ruede | |
| 6,312,244 B1 | 11/2001 | Levera et al. | 2003/0021915 A1 | 1/2003 | Rohatgi et al. | |
| 6,321,904 B1 | 11/2001 | Mitchell | 2003/0065045 A1 | 4/2003 | Falke et al. | |
| 6,329,448 B1 | 12/2001 | Gutsche et al. | 2003/0083394 A1 | 5/2003 | Clatty | |
| 6,343,924 B1 | 2/2002 | Klepsch | 2003/0090016 A1 | 5/2003 | Petrovic et al. | |
| 6,348,514 B1 | 2/2002 | Calabrese et al. | 2003/0143910 A1 | 7/2003 | Mashburn et al. | |
| 6,383,599 B1* | 5/2002 | Bell et al. ............ 428/95 | 2003/0158365 A1 | 8/2003 | Brauer et al. | |
| 6,387,504 B1 | 5/2002 | Mushovic | 2003/0232933 A1 | 12/2003 | Lagneaux et al. | |
| 6,409,949 B1 | 6/2002 | Tanaka et al. | 2004/0048055 A1 | 3/2004 | Branca | |
| 6,429,257 B1 | 8/2002 | Buxton et al. | 2004/0049002 A1 | 3/2004 | Andrews et al. | |
| 6,432,335 B1 | 8/2002 | Ladang et al. | 2004/0121161 A1 | 6/2004 | Shugert et al. | |
| 6,433,032 B1 | 8/2002 | Hamilton | 2004/0144287 A1 | 7/2004 | Tardif et al. | |
| 6,433,121 B1 | 8/2002 | Petrovic et al. | 2004/0198900 A1 | 10/2004 | Madaj | |
| 6,455,605 B1 | 9/2002 | Giorgini et al. | 2004/0266993 A1 | 12/2004 | Evans | |
| 6,455,606 B1 | 9/2002 | Kaku et al. | 2005/0011159 A1 | 1/2005 | Standal et al. | |
| 6,458,866 B1 | 10/2002 | Oppermann et al. | 2005/0031578 A1 | 2/2005 | Deslauriers et al. | |
| 6,465,569 B1 | 10/2002 | Kurth | 2005/0079339 A1 | 4/2005 | Riddle | |
| 6,467,610 B1 | 10/2002 | MacLachlan | 2005/0131092 A1 | 6/2005 | Kurth et al. | |
| 6,469,667 B2 | 10/2002 | Fox et al. | 2005/0131093 A1 | 6/2005 | Kurth et al. | |
| 6,485,665 B1 | 11/2002 | Hermanutz et al. | 2005/0161855 A1 | 7/2005 | Brown et al. | |
| 6,534,617 B1 | 3/2003 | Batt et al. | 2005/0163969 A1 | 7/2005 | Brown | |
| 6,541,534 B2 | 4/2003 | Allen et al. | 2005/0171243 A1 | 8/2005 | Hemmings et al. | |
| 6,552,660 B1 | 4/2003 | Lisowski | 2005/0182228 A1 | 8/2005 | Kurth | |
| 6,555,199 B1 | 4/2003 | Jenkines | 2005/0222303 A1 | 10/2005 | Cernohous | |
| 6,571,935 B1 | 6/2003 | Campbell et al. | 2005/0260351 A1 | 11/2005 | Kurth et al. | |
| 6,573,309 B1 | 6/2003 | Reitenbach et al. | 2005/0281999 A1 | 12/2005 | Hoffman et al. | |
| 6,573,354 B1 | 6/2003 | Petrovic et al. | 2005/0287238 A1 | 12/2005 | Taylor | |
| 6,578,619 B2 | 6/2003 | Wright | 2006/0014891 A1 | 1/2006 | Yang et al. | |
| 6,579,932 B1 | 6/2003 | Schipper et al. | 2006/0041155 A1 | 2/2006 | Casper | |
| 6,604,848 B2 | 8/2003 | Tanaka et al. | 2006/0041156 A1 | 2/2006 | Casper et al. | |
| 6,605,343 B1 | 8/2003 | Motoi et al. | 2006/0045899 A1 | 3/2006 | Sarangapani | |

| | | |
|---|---|---|
| 2006/0071369 A1 | 4/2006 | Butteriss |
| 2006/0105145 A1 | 5/2006 | Brown |
| 2006/0115625 A1 | 6/2006 | Brown |
| 2006/0186571 A1 | 8/2006 | Brown |
| 2006/0186572 A1 | 8/2006 | Brown |
| 2006/0217517 A1 | 9/2006 | Daly |
| 2006/0270747 A1 | 11/2006 | Griggs |
| 2006/0273486 A1 | 12/2006 | Taylor et al. |
| 2007/0027227 A1* | 2/2007 | Shutov .......................... 521/172 |
| 2007/0037953 A1 | 2/2007 | Geiger et al. |
| 2007/0052128 A1 | 3/2007 | Taylor |
| 2007/0066697 A1 | 3/2007 | Gilder et al. |
| 2007/0222105 A1 | 9/2007 | Brown |
| 2007/0222106 A1 | 9/2007 | Brown |
| 2007/0222210 A1 | 9/2007 | Brown |
| 2007/0225391 A1 | 9/2007 | Brown |
| 2007/0225419 A1 | 9/2007 | Brown |
| 2008/0029925 A1 | 2/2008 | Brown |
| 2008/0132611 A1 | 6/2008 | Brown |
| 2009/0295021 A1 | 12/2009 | Brown |
| 2010/0025882 A1 | 2/2010 | Taylor et al. |
| 2010/0201014 A1 | 8/2010 | Taylor |
| 2010/0230852 A1 | 9/2010 | Brown |
| 2010/0264559 A1 | 10/2010 | Brown |
| 2010/0292397 A1 | 11/2010 | Brown |
| 2010/0296361 A1 | 11/2010 | Brown |

FOREIGN PATENT DOCUMENTS

| | | |
|---|---|---|
| CN | 1251596 A | 4/2000 |
| CN | 1052991 C | 5/2000 |
| CN | 1926282 A | 3/2007 |
| DE | 2351844 A | 4/1975 |
| GB | 01152306 | 5/1969 |
| GB | 1246940 | 9/1971 |
| GB | 2347933 | 9/2000 |
| JP | 51-89597 | 8/1976 |
| JP | 355080456 A | 6/1980 |
| JP | 58-132533 | 8/1983 |
| JP | 63-22819 | 1/1988 |
| JP | 63-202408 | 8/1988 |
| JP | 5-285941 | 11/1993 |
| JP | 7-76395 | 3/1995 |
| JP | 7-313941 | 12/1995 |
| JP | 8-188634 | 7/1996 |
| JP | 11-171960 | 6/1999 |
| JP | 2001-326361 | 11/2001 |
| JP | 2004-131654 | 4/2004 |
| JP | 2005-138567 | 6/2005 |
| KR | 2002086327 A | 11/2002 |
| SG | 124156 | 12/2008 |
| WO | WO 81/03026 | 10/1981 |
| WO | WO 87/05541 | 9/1987 |
| WO | WO 91/00304 | 1/1991 |
| WO | WO 92/07892 | 5/1992 |
| WO | WO 93/19110 | 9/1993 |
| WO | WO 93/24549 | 12/1993 |
| WO | WO 94/25529 | 11/1994 |
| WO | WO 94/27697 | 12/1994 |
| WO | WO 97/11114 A1 | 3/1997 |
| WO | WO 97/44373 | 11/1997 |
| WO | WO 98/08893 A1 | 5/1998 |
| WO | WO 99/39891 | 8/1999 |
| WO | WO 00/17249 | 3/2000 |
| WO | WO 01/72863 | 10/2001 |
| WO | WO 02/01530 | 1/2002 |
| WO | WO 2004/113248 A2 | 6/2003 |
| WO | WO 2004/078900 | 9/2004 |
| WO | WO 2004/113248 A2 | 12/2004 |
| WO | WO 2005/053938 | 6/2005 |
| WO | WO 2005/056267 | 6/2005 |
| WO | WO 2005/072187 | 8/2005 |
| WO | WO 2005/072188 A2 | 8/2005 |
| WO | WO 2005/072188 A3 | 8/2005 |
| WO | WO 2005/094255 | 10/2005 |
| WO | WO 2005/123798 | 12/2005 |
| WO | WO 2006/012149 | 6/2006 |
| WO | WO 2006/137672 A1 | 12/2006 |
| WO | WO 2007/012105 | 10/2007 |
| WO | WO 2007/112104 | 10/2007 |
| WO | WO 2007/112105 | 10/2007 |

OTHER PUBLICATIONS

Randall, D., ed., et. al., Excerpts from "The polyurethanes book", 2002, pp. 1, 166-167, 210-213, 229-231, 263-264, Dunholm Publicity Ltd., United Kingdom.
Woods, G., Excerpts from "The ICI Polyurethanes Book", 1987, pp. 119-120, 127, 135- 140, 158-159, The Netherlands.
Wypych, G., Excerpts from "Fillers", 1993, pp. 4, 48, 57, ChemTech Publishing, Ontario Canada.
Elias, H., Excerpts from "An Introduction to Polymer Science", 1997, pp. 408-409, VCH Publishers, Inc., New York, NY.
Chawla, K. K., Excerpts from "Composite Materials: Science and Engineering", 1987, pp. 89-92, Spring Verlag, New York, NY.
OSi Specialties, "Fomrez Tin Catalysts", 3 pages.
National Center for Environmental Research and Quality Assurance, Office of Research and Development, U.S. Environmental Protection Agency, Abstract of "The Use of Multi-Component Waste Products for Use in Roofing Materials," May 9, 1998.
Energy Efficient Building Products from Waste Materials, Development and Demonstration Project, Proposal, Sep. 10, 1999, NYS Energy Research & Development Authority.
Foamed Recyclables: New Process Efficiently Transforms Solid Waste into Synthetic Building Materials, Jan. 2002, United States Department of Energy, Office of Industrial Technologies, Inventions and Innovations Program.
"PVC Double Wall Corrugated Pipe Manufacturing Plant", Korea Association of Machinery Industry.
"Achieving a Wood Grain Finish Effect," dated Dec. 11, 2003, http://www.sculpt.com/technogtes/woodgrainfinish.htm.
Bayer Material Science, Product Index—Polyurethane Raw Materials Prepolymers and Systems (2006).
Bayer Material Science, Multranol 4035—Polyether Polyol, CAS No. 9049-71-2, Product Code: K114 (1997).
Bayer Material Science, Arcol Lg-56 —Polyether Polyol, Cas No. 25791-96-2, Product Code: KLLG56 (2003).
Bayer Material Science, Multranol 3900—Polyether Polyol (2006).
Urethane Soy Systems Company, Material Safety Data Sheet, SoyTherm 50 A-side, pp. 1-8.
Urethane Soy Systems Company, Material Safety Data Sheet, SoyTherm 50 B-side, pp. 1-8.
Guo et al., "Rigid Urethane Foams from a Soy Polyol-Dod Hybrid," USDA Agricultural Research Service, http://ars.usda.gov/research/publications/publications.htm?SEQ_NO_115=145249 (May 9, 2003).
Guo et al., "Polyols and Polyurethanes from Hydroformylation of Soybean Oil," Journal of Polymers and the Environment 10(1-2):49-52 (Apr. 2002).
Pollack, "Soy vs. Petro Polyols A Life-Cycle Comparison," Omni Tech International, Ltd. (date unknown).
Petrovic et al., "Industrial Oil Products Program," Aocs Archives, (2007).
Office Action issued in U.S. Appl. No. 10/764,012 on Nov. 15, 2005.
Office Action issued in U.S. Appl. No. 10/764,012 on May 31, 2006.
Office Action issued in U.S. Appl. No. 10/764,012 on Jul. 31, 2007.
International Search Report issued in International Application No. PCT/US2007/007468 on Nov. 19, 2007.
Partial International Search Report issued in International Application No. PCT/US2007/007470 on Nov. 19, 2007.
Office Action Issued in U.S. Appl. No. 11/691,449 on Jun. 30, 2008.
Office Action issued in U.S. Appl. No. 10/764,012 on Jan. 7, 2008.
Co-pending US Appl. No. 11/417,385, filed May. 4, 2006, titled Continuous Forming System Utilizing Up to Six Endless Belts, and assigned to the assignee of this application.
Co-pending U.S Appl. No. 11/593,316, filed Nov. 6, 2006, titled Method for Molding Three-Dimensional Foam Products Using a Continuous Forming Apparatus, and assigned to the assignee of this application.
Office Action issued in U.S. Appl. No. 11/691,451 on Jun. 27, 2008.
Office Action issued in U.S. Appl. No. 10/764,013, on Dec. 5, 2005.
Office Action issued in U.S. Appl. No. 10/764,013, on Jun. 7, 2006.

Supplemental Information Disclosure Statement filed in U.S. Appl. No. 10/764,012 on Apr. 19, 2007.
Supplemental Information Disclosure Statement filed in U.S. Appl. No. 11/165,071, on Apr. 19, 2007.
Oertel, G., Editor: Polyurethane Handbook 2nd Edition: 1994: pp. 136-137, 182-183, 252-253; Carl Hanser Verlag, Munich.
Cleated Belt Puller, http://www.esi-extrustion.com/cbpuller.htm, Aug. 5, 2002.
RDN Manufacturing Co., Inc., 140, 148 & 160 Belt Pullers, http://www.rdnmfg.com/products/pu11140_160.htm, Aug. 5, 2002.
International Search Report issued in International Application No. PCT/US2007/007468 on Nov. 19, 2007
Mar. 13, 2009 European Search Report for EP Patent Appln. 05762651.7.
Winkler, Non-Final Rejection of U.S. Appl. No. 11/691,449, Jun. 30, 2008
Winkler, Non-Final Rejection of U.S. Appl. No. 11/691,451, Jun. 27, 2008.
Chevalier, Non-Final Rejection of U.S. Appl. No. 11/317,494, Mar. 26, 2009.
Deposition of Wade Brown vol. 1, pp. 1-212 (Nov. 17, 2005)—Redacted.
Deposition of Wade Brown vol. 2, pp. 1-256 (Nov. 17, 2005)—Redacted.
Deposition of Wade Brown vol. 3, pp. 1-302 (Nov. 21, 2005).
Deposition of Edward J. Butteriss vol. 1, pp. 1-501 (Dec. 16, 2005).
Deposition of Edward J. Butteriss vol. 2, pp. 1-195 (Dec. 28, 2005).
Deposition of Thomas E. Jurgensen, pp. 1-407 (Jan. 9, 2006).
Deposition of Daniel Klempner, pp. 1-120 (Jan. 6, 2006)—Redacted.
Deposition of Fyodor Shutov vol. 1, pp. 1-312 (Dec. 15, 2005)—Redacted.
Deposition of Fyodor Shutov vol. 2, pp. 1-182 (Dec. 28, 2005).
Deposition of John R Taylor, pp. 1-388 (Dec. 7, 2005)—Redacted.
Deposition of Zachary R. Taylor vol. 1, pp. 1-221 (Dec. 29, 2005)—Redacted.
Deposition of Zachary R. Taylor vol. 2, pp. 1-285 (Jan. 5, 2006)—Redacted.
Summary of Opinions, Daniel Klempner, pp. 1-11 (Jan. 4, 2006).
Past and present office actions, amendments, arguments, and other relevant documents or materials in the file history of co-pending U.S. Appl. No. 10/764,012, filed Jan. 23, 2004, entitled Filled Polymer Composite and Synthetic Building Material Compositions.
Past and present office actions, amendments, arguments, and other relevant documents or materials in the file history of co-pending U.S. Appl. No. 10/764,013, filed Jan. 23, 2004, entitled Continuous Forming System Utilizing Up to Six Endless Belts.
Past and present office actions, amendments, arguments, and other relevant documents or materials in the file history of co-pending U.S. Appl. No. 10/952,186, filed Sep. 28, 2004, entitled Apparatus for the Continuous Production of Plastic Composites.
Past and present office actions, amendments, arguments, and other relevant documents or materials in the file history of co-pending U.S. Appl. No. 11/165,071, filed Jun. 23, 2005, entitled Continuous Forming Apparatus for Three-Dimensional Foam Products.
Past and present office actions, amendments, arguments, and other relevant documents or materials in the file history of co-pending U.S. Appl. No. 11/317,494, filed Dec. 22, 2005, entitled Filled Polymer Composite and Synthetic Building Material Compositions.
Past and present office actions, amendments, arguments, and other relevant documents or materials in the file history of co-pending U.S. Appl. No. 11/317,958, filed Dec. 22, 2005, entitled Filled Polymer Composite and Synthetic Building Material Compositions.
Past and present office actions, amendments, arguments, and other relevant documents or materials in the file history of co-pending U.S. Appl. No. 11/407,416, filed Apr. 20, 2006, entitled Filled Polymer Composite and Synthetic Building Material Compositions.
Past and present office actions, amendments, arguments, and other relevant documents or materials in the file history of co-pending U.S. Appl. No. 11/407,661, filed Apr. 20, 2006, entitled Filled Polymer Composite and Synthetic Building Material Compositions.
Past and present office actions, amendments, arguments, and other relevant documents or materials in the file history of co-pending U.S. Appl. No. 11/417,385, filed May 4, 2006, entitled Continuous Forming System Utilizing Up to Six Endless Belts.
Past and present office actions, amendments, arguments, and other relevant documents or materials in the file history of co-pending U.S. Appl. No. 11/593,316, filed Nov. 6, 2006, entitled Method for Molding Three-Dimensional Foam Products Using a Continuous Forming Apparatus.
Past and present office actions, amendments, arguments, and other relevant documents or materials in the file history of co-pending U.S. Appl. No. 11/691,438, filed Mar. 26, 2007, entitled Polyurethane Composite Materials.
Past and present office actions, amendments, arguments, and other relevant documents or materials in the file history of co-pending U.S. Appl. No. 11/691,446, filed Mar. 26, 2007, entitled Extrusion of Polyurethane Composite Materials.
Past and present office actions, amendments, arguments, and other relevant documents or materials in the file history of co-pending U.S. Appl. No. 11/691,449, filed Mar. 26, 2007, entitled Polyurethane Composite Materials.
Past and present office actions, amendments, arguments, and other relevant documents or materials in the file history of co-pending U.S. Appl. No. 11/691,456, filed Mar. 26, 2007, entitled Extrusion of Polyurethane Composite Materials.
Past and present office actions, amendments, arguments, and other relevant documents or materials in the file history of co-pending U.S. Appl. No. 11/841,901, filed Aug. 20, 2007, entitled Filled Polymer Composite and Synthetic Building Material Compositions.
Past and present office actions, amendments, arguments, and other relevant documents or materials in the file history of co-pending U.S. Appl. No. 12/361,488, filed Jan. 28, 2009, entitled Continuous Forming System Utilizing Up to Six Endless Belts.
Past and present office actions, amendments, arguments, and other relevant documents or materials in the file history of co-pending U.S. Appl. No. 12/473,138, filed May 27, 2009, entitled Extrusion of Polyurethane Composite Materials.
Past and present office actions, amendments, arguments, and other relevant documents or materials in the file history of co-pending U.S. Appl. No. 12/692,241, filed Jan. 22, 2010, entitled Method for Molding Three-Dimensional Foam Products Using a Continuous Forming Apparatus.
Past and present office actions, amendments, arguments, and other relevant documents or materials in the file history of co-pending U.S. Appl. No. 12/710,472, filed Feb. 23, 2010, entitled Extrusion of Polyurethane Composite Materials.
Past and present office actions, amendments, arguments, and other relevant documents or materials in the file history of co-pending U.S. Appl. No. 12/727,365, filed Mar. 19, 2010, entitled Filled Polymer Composite and Synthetic Building Material Compositions.
Past and present office actions, amendments, arguments, and other relevant documents or materials in the file history of co-pending U.S. Appl. No. 12/786,206, filed May 24, 2010, entitled Extrusion of Polyurethane Composite Materials.
Past and present office actions, amendments, arguments, and other relevant documents or materials in the file history of co-pending U.S. Appl. No. 12/843,265, filed Jul. 26, 2010, entitled Filled Polymer Composite and Synthetic Building Material Compositions.
Past and present office actions, amendments, arguments, and other relevant documents or materials in the file history of co-pending U.S. Appl. No. 13/010,646, filed Jan. 20, 2011, entitled Extrusion of Polyurethane Composite Materials.
Final Office Action issued in U.S. Appl. No. 10/764,012 on Jan. 13, 2009.
Office Action issued in U.S. Appl No. 10/764,012 on Aug. 20, 2009.
Notice of Allowance issued in U.S. Appl. No. 10/764,012 on Apr. 21, 2010.
Office Action issued in U.S. Appl. No. 10/952,186 on Oct. 2, 2008.
Final Office Action issued in U.S. Appl. No. 10/952,186 on Apr. 16, 2009.
Office Action issued in U.S. Appl. No. 10/952,186 on Dec. 10, 2009.
Notice of Allowance issued in U.S. Appl. No. 10/952,186 on May 5, 2010.
Office Action issued in U.S. Appl. No. 11/165,071 on Aug. 7, 2006.

Notice of Allowance issued in U.S. Appl. No. 11/165,071 on Apr. 5, 2007.
Notice of Allowance issued in U.S. Appl. No. 11/165,071 on Aug. 16, 2007.
Office Action issued in U.S. Appl. No. 11/317,494 on Sep. 21, 2009.
Notice of Allowance issued in U.S. Appl. No. 11/317,494 on May 6, 2010.
Notice of Allowance issued in U.S. Appl. No. 11/317,494 on Aug. 6, 2010.
Office Action issued in U.S. Appl. No. 11/317,958 on Oct. 6, 2008.
Final Office Action issued in U.S. Appl. No. 11/317,958 on May 28, 2009.
Office Action issued in U.S. Appl. No. 11/317,958 on Dec. 21, 2009.
Office Action in U.S. Appl. No. 11/407,416 on Nov. 7, 2008.
Office Action issued in U.S. Appl. No. 11/407,416 on Aug. 20, 2009.
Final Office Action issued in U.S. Appl. No. 11/407,416 on May 25, 2010.
Notice of Allowance issued in U.S. Appl. No. 11/407,416 on Apr. 4, 2011.
Office Action issued in U.S. Appl No. 11/407,661 on Nov. 7, 2008.
Office Action issued in U.S. Appl. No. 11/407,661 on Aug. 20, 2009.
Final Office Action issued in U.S. Appl. No. 11/407,661 on May 27, 2010.
Notice of Allowance issued in U.S. Appl. No. 11/407,661 on Mar. 29, 2011.
Office Action issued in U.S. Appl. No. 11/417,385 on Aug. 24, 2007.
Final Office Action issued in U.S. Appl. No. 11/417,385 on Jul. 11, 2008.
Notice of Allowance issued in U.S. Appl. No. 11/417,385 on Oct. 8, 2008.
Office Action issued in U.S. Appl. No. 11/593,316 on Jun. 3, 2008.
Final Office Action issued in U.S. Appl. No. 11/593,316 on Feb. 5, 2009.
Notice of Allowance issued in U.S. Appl. No. 11/593,316 on Sep. 10, 2009.
Office Action issued in U.S. Appl. No. 11/691,438 on Jun. 10, 2009.
Final Office Action issued in U.S. Appl. No. 11/691,438 on Jun. 11, 2010.
Office Action issued in U.S. Appl. No. 11/691,438 on Feb. 18, 2011.
Office Action issued in U.S. Appl. No. 11/691,446 on Jul. 23, 2009.
Final Office Action issued in U.S. Appl. No. 11/691,446 on Feb. 24, 2010.
Final Office Action issued in U.S. Appl. No. 11/691,449 on Apr. 17, 2009.
Office Action Issued in U.S. Appl. No. 11/691,449 on Dec. 30, 2009.
Final Office Action issued in U.S. Appl. No. 11/691,449 on Jul. 23, 2010.
Office Action issued in U.S. Appl. No. 11/691,449 on Feb. 24, 2011.
Office Action issued in U.S. Appl. No. 11/691,456 on Sep. 23, 2009.
Office Action issued in U.S. Appl. No. 11/841,901 on Jul. 9, 2009.
Final Office Action issued in U.S. Appl. No. 11/841,901 on Mar. 17, 2010.
Office Action issued in U.S. Appl. No. 12/361,488 on Jun. 30, 2010.
Final Office Action issued in U.S. Appl. No. 12/361,488 on Nov. 23, 2010.
Office Action issued in U.S. Appl. No. 12/473,138 on Dec. 8, 2010.
Office Action issued in U.S. Appl. No. 12/710,472 on Dec. 29, 2010.
Office Action Issued in U.S. Appl. No. 12/727,365 on Oct. 21, 2010.
Office Action issued in U.S. Appl. No. 12/786,206 on Dec. 3, 2010.
Office Action issued in U.S. Appl. No. 12/843,265 on Nov. 26, 2010.
International Preliminary Report on Patentability and Written Opinion of the International Searching Authority issued in International Application No. PCT/US2005/001569 on Aug. 3, 2006.
International Search Report for PCT/US05/01570 mailed on Jan. 25, 2006.
International Preliminary Report on Patentability and Written Opinion of the International Searching Authority for PCT/US05/01570, mailed on Aug. 3, 2006.
International Search Report and Written Opinion of the International Searching Authority for International Application No. PCT/US05/22076, mailed on Aug. 29, 2006.
International Preliminary Report on Patentability and Written Opinion of the International Searching Authority for International Application No. PCT/US05/22076, mailed on Jan. 11, 2007.
International Preliminary Report on Patentability and Written Opinion of the International Searching Authority for International Application No. PCT/US2007/007468 mailed on Oct. 9, 2008.
International Preliminary Report on Patentability and Written Opinion of the International Searching Authority for International Application No. PCT/US2007/007470, mailed on Oct. 9, 2008.
Office Action issued in Australian Application No. 2005208713 on May 6, 2009.
Office Action issued in Australian Application No. 2005208714 on Jun. 26, 2009.
Office Action issued in Australian Application No. 2005267399 on Oct. 6, 2009.
Office Action issued in Chinese Application No. 20058000030186 on Apr. 4, 2008.
Office Action issued in Chinese Application No. 20058000030186 on Oct. 31, 2008.
Office Action issued in Chinese Application No. 20058000030186 on Apr. 24, 2009.
Notification of Decision of Rejection issued in Chinese Application No. 20058000030186 on Sep. 11, 2009.
Office Action issued in Chinese Application No. 2005800206677 on Aug. 7, 2009.
Office Action issued in Chinese Application No. 2005800206677 on Mar. 3, 2011.
European Supplemental Search Report for European Application No. 05711595.8, dated Jan. 22, 2009.
Office Action issued in European Application No. 05711595.8 on May 11, 2009.
Office Action issued in European Application No. 05762651.7 on Oct. 2, 2009.
Office Action issued in Indonesian Application No. W-00 2006 020345 on May 26, 2008.
Office Action issued in Japanese Application No. 2006-551203 on Nov. 29, 2010.
Office Action issued in New Zealand Application No. 548626 on Feb. 23, 2009.
Office Action issued in New Zealand Application No. 548628 on Jan. 26, 2009.
Written Opinion issued by the Austrian Patent Office on Jul. 31, 2007 in Singapore Application No. 200604927-4.
Examination Report issued by the Austrian Patent Office on Jun. 20, 2008 in Singapore Application No. 200604927-4.
Extended European Search Report and European Search Opinion for European Patent Application No. 11165942.1 dated Jul. 21, 2011.
Final Office Action issued in U.S. Appl. No. 12/727,365 on Jul. 12, 2011.
Final Office Action issued in U.S. Appl. No. 12/843,265 on Jul. 18, 2011.
Office Action issued in U.S. Application No. 12/692,241 on Aug. 5, 2011.
Past and present office actions, amendments, arguments, and other relevant documents or materials in the file history of co-pending U.S. Appl. No. 13/112,670, filed May 20, 2011, entitled Continuous Forming System Utilizing Up to Six Endless Belts.
Past and present office actions, amendments, arguments, and other relevant documents or materials in the file history of co-pending U.S. Appl. No. 13/152,190, filed Jun. 2, 2011, entitled Extrusion of Polyurethane Composite Materials.
Past and present office actions, amendments, arguments, and other relevant documents or materials in the file history of co-pending U.S. Appl. No. 13/155,066, filed Jun. 7, 2011, entitled Extrusion of Polyurethane Composite Materials.
Past and present office actions, amendments, arguments, and other relevant documents or materials in the file history of co-pending U.S. Appl. No. 13/170,932, filed Jun. 28, 2011, entitled Extrusion of Polyurethane Composite Materials.

* cited by examiner

POLYURETHANE COMPOSITE MATERIALS

CROSS-REFERENCE TO RELATED APPLICATIONS

This application claims the priority benefit under 35 U.S.C. §119(e) of the provisional application 60/785,726, filed Mar. 24, 2006 and 60/785,749, filed Mar. 24, 2006, which are hereby incorporated by reference in their entireties.

BACKGROUND OF THE INVENTION

1. Field

The invention relates to highly filled polyurethane composite materials, methods of forming the same, and articles including the same. It particularly relates to the material used in the formation of highly filled polyurethane composite materials.

2. Description of the Related Technology

Polymeric composite materials that contain organic or inorganic filler materials have become desirable for a variety of uses because of their excellent mechanical properties, weathering stability, and environmental friendliness.

These materials can be are relatively low density, due to their foaming, or high density when unfoamed, but are extremely strong, due to the reinforcing particles or fibers used throughout. Their polymer content also gives them good toughness (i.e., resistance to brittle fracture), and good resistance to degradation from weathering when they are exposed to the environment. This combination of properties renders some polymeric composite materials very desirable for use in building materials, such as roofing materials, decorative or architectural products, outdoor products, insulation panels, and the like.

SUMMARY OF THE INVENTION

Described herein are polymeric composite materials. In some embodiments, the polymeric composite materials contain some amount of filler content. In particular embodiments, a polyurethane composite material may include a polyurethane formed by reaction of a reaction mixture of one or more monomeric or oligomeric poly- or di-isocyanates; and at least one polyol. In preferred embodiments the one or more monomeric or oligomeric poly- or di-isocyanates may include an MDI. In preferred embodiments, the at least one polyol may be selected from a plant-based polyol or an oil based polyol. Suitable polyols include polyester polyols, polyether polyols, polycarbonate polyols, polyacrylic polyols, and others described herein. More than one polyol may be used in accordance with certain embodiments.

In some embodiments, the composite material may additionally include an inorganic filler. In some embodiments, the inorganic filler may include coal ash such as fly ash or bottom ash or mixtures of fly and bottom ash. In some embodiments, the polyurethane composite material comprises about 40-85% inorganic filler. In some embodiments, the polyurethane composite material comprises about 65-75% inorganic filler. In some embodiments, the polyurethane composite material comprises about 60-85% inorganic filler.

In particular embodiments, the polyurethane composite material may additionally include one or more selected from the group consisting of chain extenders, cross linkers, and combinations thereof. In some embodiments, the polyurethane composite material includes a chain extender. In some embodiments, the chain extender is one or more selected from the group consisting of ethylene glycol, glycerin, 1,4-butane diol, trimethylolpropane, glycerol, sorbitol, and combinations thereof. In some embodiments, the chain extender is an amine chain extender, for example diamines. In certain embodiments, the polyurethane composite material includes glycol extenders. In some embodiments, the chain extender is organic compound having two or more hydroxyl groups.

In some embodiments, the polyurethane composite material is in the form of a shaped article. In certain embodiments, the shaped article is selected from the group consisting of roofing material, siding material, carpet backing, synthetic lumber, building panels, scaffolding, cast molded products, decking material, fencing material, marine lumber, doors, door parts, moldings sills, stone, masonry, brick products, post signs, guard rails, retaining walls, park benches, tables slats, and railroad ties. In certain embodiments, a solid surface article includes a portion, wherein the portion includes at least some of the polyurethane composite material as described herein.

In some embodiments, the polyurethane composite material includes fibrous materials. In certain embodiments, the fibrous material may be chopped fibers such as chopped fiber glass or chopped basalt fiber. In certain embodiments, the polyurethane composite material includes axially oriented fiber rovings disposed on, in, or beneath the surface of the composite.

The aforementioned components may be reacted in accordance with certain techniques and other additives. For example, the polyurethane composite material may be mixed and reacted in an extruder. In certain embodiments, a method of forming a polyurethane composite material includes providing at least one polyol, providing at least one poly or di-isocyanate, providing an inorganic filler; and extruding the at least one polyol, the at least one poly or di-isocyanate, and the inorganic filler, into an extruded mixture. In accordance with certain embodiments, additives such as chain extenders and coupling agents may be extruded. In certain embodiments, the method further includes placing the extruded mixture in a mold. In some embodiments, the extruded mixture may be shaped in the mold. In certain embodiments, the mold is formed by one or more belts of a forming device.

In certain embodiments, there may be certain advantages by mixing the at least one polyol with a solvent. For example, it has been discovered that treatment or mixing with a solvent may result in thicker and harder skin of the formed composite material. In some embodiments, the solvent is an organic solvent. In other embodiments, the solvent is selected from the group consisting of pentane, hexane, carbon tetrachloride, trichloroethylene, methylene chloride, chloroform, methyl chloroform, perchloroethylene, and ethyl acetate. In particular embodiments, about 2 to about 10 weight percent of the solvent may be added to one or more components prior to mixing and/or extruding.

In some embodiments, a method of forming a polyurethane composite material includes providing at least one polyol, providing at least one poly or di-isocyanate, providing about 45 to about 85 weight percent of an inorganic filler, providing excess blowing agent; extruding the at least one polyol, the at least one poly or di-isocyanate, the inorganic filler, and the excess blowing agent into an extruded, foaming mixture, and containing the extruded mixture in a mold. In certain embodiments, the mold sufficiently restrains the foaming mixture to provide a desired shape or density to the composite material. In some embodiment, restraining such foaming composite material may result in higher strength and stiffness of the composite material. This may result from the alteration of cell size and cell structure.

In some embodiments, a method of coating a solid surface article includes depositing the polyurethane composite material as described herein on a solid surface article, shaping the polyurethane composite material on the solid surface article in a mold; and curing the polyurethane composite material on the solid surface article.

DETAILED DESCRIPTION OF THE EMBODIMENTS

Described herein are polymeric composite materials. In particular embodiments, the polymeric composite material include polyurethane composite materials. While the embodiments described herein are specifically related to polyurethane composite materials, the technology may also be applicable to many other polymeric resins, particularly those related to highly filled thermosetting polymers. Generally, a polyurethane is any polymer consisting of a chain of organic units joined by urethane linkages. Typically, a polyurethane may be formed by reaction of one or more monomeric or oligomeric poly- or di-isocyanates (sometimes referred to as "isocyanate") and at least one polyol, such as a polyester polyol or a polyether polyol. These reactions may further be controlled by various additives and reaction conditions. For example, one or more surfactants may be used to control cell structure and one or more catalysts may be used to control reaction rates. Advantageously, the addition of certain polyol and isocyanate monomers and certain additives (e.g., catalysts, crosslinkers, surfactants, blowing agents), may produce a polyurethane material that is suitable for commercial applications.

As is well known to persons having ordinary skill in the art, polyurethane materials may also contain other polymeric components by virtue of side reactions of the polyol or isocyanate monomers. For example, a polyisocyanurate may be formed by the reaction of optionally added water and isocyanate. In addition, polyurea polymers may also be formed. In some embodiments, such additional polymer resins may have an effect on the overall characteristics of the polyurethane composite material.

It has further been found that some portion of the polymeric component of polyurethanes may be replaced with one or more fillers such as particulate material and fibrous materials. With the addition of such fillers, the polyurethane composite materials may still retain good chemical and mechanical properties. These properties of the polyurethane composite material allows for its use in building materials and other structural applications. Advantageously, the polyurethane composite material may contain large loadings of filler content without substantially sacrificing the intrinsic structural, physical, and mechanical properties of the polymer. Such building materials would have advantages over composite materials made of less or no filler. For example, the building materials may be produced at substantially decreased cost. Furthermore, decreased complexity of the process chemistry may also lead to decreased capital investment in process equipment.

In one embodiment, the composite materials have a matrix of polymer networks and dispersed phases of particulate or fibrous materials. The polymer matrix includes a polyurethane network formed by the reaction of a poly- or di-isocyanate and one or more polyols. The matrix is filled with a particulate phase, which can be selected from one or more of a variety of components, such as fly ash particles, axially oriented fibers, fabrics, chopped random fibers, mineral fibers, ground waste glass, granite dust, slate dust or other solid waste materials.

Such polyurethane composite materials may be formed with a desired density, even when foamed, to provide structural stability and strength. In addition, the polyurethane composite materials can be easily tuned to modify its properties by, e.g., adding oriented fibers to increase flexural stiffness, or by adding pigment or dyes to hide the effects of scratches. Also, such polyurethane composite materials may also be self-skinning, forming a tough, slightly porous layer that covers and protects the more porous material beneath. Such tough, continuous, highly adherent skin provides excellent water and scratch resistance. In addition, as the skin is forming, an ornamental pattern (e.g., a simulated wood grain) can be impressed on it, increasing the commercial acceptability of products made from the composite. In one embodiment, an ornamental pattern may be in a mold, and the pattern is molded into the composite material, Described herein are certain improvements that may be used in the production of polyurethane composite materials. Some previously described polyurethane composite material systems are included in U.S. patent application Ser. No. 10/764,012, filed Jan. 23, 2004, and entitled "FILLED POLYMER COMPOSITE AND SYNTHETIC BUILDING MATERIAL COMPOSITIONS," now published as U.S Patent Application Publication No. 2005-163969-A1, and U.S. patent application Ser. No. 11/190,760, filed Jul. 27, 2005, and entitled "COMPOSITE MATERIAL INCLUDING RIGID FOAM WITH INORGANIC FILLERS, " now published as U.S Patent Application Publication No. 2007-0027227 A1, which are both hereby incorporated by reference in their entireties. However, in no way, are such polyurethane composite material systems intended to limit the scope of the improvements described in the present application.

The various components and processes of preferred polyurethane composite materials are further described herein:
Monomeric or Oligomeric Poly or Di-Isocyanates As discussed above, one of the monomeric components used to form a polyurethane polymer of the polyurethane composite material is one or more monomeric or oligomeric poly or di-isocyanates. The polyurethane is formed by reacting a poly- or di-isocyanate. In some embodiments, an aromatic diisocyanate or polyisocyanate may be used.

In certain embodiments methylene diphenyl diisocyanate (MDI) is used. The MDI can be MDI monomer, MDI oligomer, or mixtures thereof. The particular MDI used can be selected based on the desired overall properties, such as the amount of foaming, strength of bonding to the inorganic particulates, wetting of the inorganic particulates in the reaction mixture, strength of the resulting composite material, and stiffness (elastic modulus). Although toluene diisocyanate can be used, MDI is generally preferable due to its lower volatility and lower toxicity. Other factors that influence the particular MDI or MDI mixture are viscosity (a low viscosity is desirable from an ease of handling standpoint), cost, volatility, reactivity, and content of 2,4 isomer. Color may be a significant factor for some applications, but does not generally affect selection of an MDI for preparing an article.

Light stability is also not a particular concern for selecting MDI for use in the composite material. According to some embodiments, the composite material allows the use of isocyanate mixtures not generally regarded as suitable for outdoor use, because of their limited light stability. When used in to form the polyurethane composite material, such materials surprisingly exhibit excellent light stability, with little or no yellowing or chalking. Suitable MDI compositions include those having viscosities ranging from about 25 to about 200 cp at 25° C. and NCO contents ranging from about 30% to about 35%. Generally, isocyanates are used that provide at least 1 equivalent NCO group to 1 equivalent OH group from the polyols, desirably with about 5% to about 10% excess NCO groups. Useful polyisocyanates also may include aromatic polyisocyanates. Suitable examples of aromatic polyisocyanates include 4,4-diphenylmethane diisocyanate (methylene diphenyl diisocyanate), 2,4- or 2,6-toluene diisocyanate, including mixtures thereof, p-phenylene diisocyanate, tetramethylene and hexamethylene diisocyanates, 4,4-dicyclohexylmethane diisocyanate, isophorone diisocyanate, mixtures of 4,4-phenylmethane diisocyanate and polymethylene polyphenylisocyanate. In addition, triisocyanates such as, 4,4,4-triphenylmethane triisocyanate 1,2,4-benzene triisocyanate; polymethylene polyphenyl polyisocyanate; and methylene polyphenyl polyisocyanate, may be used. Isocyanates are commercially available from Bayer USA, Inc. under the trademarks MONDUR and DESMODUR. Suitable isocyanates include Bayer MRS-4, Bayer MR Light, Dow PAPI 27, Bayer MR5, Bayer MRS-2, and Huntsman Rubinate 9415.

In certain embodiments, the average functionality of the isocyanate component is between about 1.5 to about 4. In other embodiments, the average functionality of the isocyanate component is about 3. In other embodiments, the average functionality of the isocyanate component is less than about 3, including, about 1.8, 1.9, 2.0, 2.1, 2.2, 2.3, 2.4, 2.5, 2.6, 2.7, 2.8, and 2.9. In some embodiments, the isocyanate has a functionality of about 2. Some of these embodiments produce polyurethane composite materials with higher mechanical strengths and lower costs than polyurethane composite material comprising more than about 2.

As indicated above, the isocyanate used in the invention is reacted with one or more polyols. In general, the ratio of isocyanate to polyol (isocyanate index), based on equivalent weights (OH groups for polyols and NCO groups for isocyanates) is generally in the range of about 0.5:1 to about 1.5:1, more particularly from about 0.8:1 to about 1.1:1, and in another embodiment, from about 0.8:1 to about 1.2:1. Ratios in these ranges provide good foaming and bonding to inorganic particulates, and yields low water pickup, fiber bonding, heat distortion resistance, and creep resistance properties. However, precise selection of the desired ratio will be affected by the amount of water in the system, including water added per se as a foaming agent, and water introduced with other components as an "impurity."

In some embodiments, an isocyanate may be selected to provide a reduced isocyanate index. It has been discovered that the isocyanate index can be reduced without compromising the polyurethane composite material's chemical or mechanical properties. It is additionally advantageous according to some embodiments to use an isocyanate with a reduced isocyanate index as isocyanates are generally higher priced than polyols. Thus, a polyurethane system formed by an isocyanate monomer with a reduced isocyanate index may result in reduced cost of producing the total system.

Polyols

According to some embodiments, the polyurethane polymer is a reaction product of one or more polyols with an isocyanate. The one or more polyols used may be single monomers, oligomers, or blends. Mixtures of polyols can be used to influence or control the properties of the resulting polymer network and composite material. The properties, amounts, and number of polyols used may be varied to produce a desired polyurethane composite material.

It is generally desirable to use polyols in liquid form, and generally in the lowest viscosity liquid form available, as these can be more easily mixed with the inorganic particulate material. So-called "EO" tipped polyols can be used; however their use is generally avoided where it is desired to avoid "frosting" of the polymer material when exposed to water.

In some embodiments, the at least one polyol include a polyester or polyether polyol. Polyether polyols are commercially available from, for example, Bayer Corporation under the trademark MULTRANOL. In general, desirable polyols include polyether polyols, such as MULTRANOL (Bayer), including MULTRANOL 3400 (viscosity of 840 cP at room Temperature), MULTRANOL 3900, a polyoxpropylene triol modified with ethylene oxide (viscosity of 820 cP at room temperature), Argol LG-56, a polypropylene oxide-based triol (viscosity of 480 at room temperature), or MULTRANOL 4035, a sucrose-based polyether polyol (viscosity of 500-700 cP at room temperature), ethylene glycol (viscosity of 21 cP at room temperature), polypropylene glycol, polyethylene glycol, diethylene glycol (viscosity of 37 cP at room temperature), triethylene glycol (43 cP at room temperature), dipropylene glycol (viscosity of 75 cP at room temperature), glycerol (viscosity of 1490 cP at 20 ° C.), 2-pentane diol, pentaerythritol adducts, 1-trimethylolpropane adducts, trimethylolethane adducts, ethylendiamine adducts, and diethylenetriamine adducts, 2-butyn-1,4-diol, neopentyl glycol, 1,2-propanediol (viscosity of 49 cP at room temperature), pentaerythritol, mannitol, 1,6-hexanediol, 1,3-buytylene glycol, hydrogenated bisphenol A, polytetramethyleneglycolethers, polythioethers, and other di- and multi-functional polyethers and polyester polyethers, and mixtures thereof. The polyols need not be miscible, but should not cause compatibility problems in the polymeric composite.

In some embodiments, plant-based polyols are used as at least one polyol. These polyols are lower in cost, and not dependent on the price and availability of petroleum. In some embodiments, the plant-based polyols provide a polyurethane system that is substantially identical to that provided by oil-based polyols. In other embodiments, plant-based polyols can be used to replace at least a portion of the oil-based polyols. By employing plant-based polyols, the polyurethane composite material is more environmentally safe and friendly. In addition, certain equipment used to handle and dispose of oil-based polyols may be costly.

In some embodiments, the at least one polyol is a polyester polyol that is substantially resistant to water soaking and swelling. Thus, these polyols can be used in the formation of polyurethane composite materials which, when cured, attracts less water. In certain cases, the polyester polyols absorb less water than polyether polyols. However, in some embodiments, polyester polyols and polyether polyols can be mixed in the formation of polyurethane composite material to provide better water resistance.

Some embodiments of the polyurethane composite material comprise at least one polycarbonate polyol. These embodiments provide higher impact and/or chemical resistance, as compared to polyurethane composite material made from polyester and/or polyether polyols. However, combinations of polycarbonate polyols, polyester polyols, and polyether polyols can be used in systems with high inorganic fillers to provide the desired mechanical and physical property of the polyurethane composite material. In some embodiments, building products comprising the polyurethane composite materials which employ at least one polyester polyol demonstrate improved water resistance.

In some embodiments, at least some phenolic polyols are used to make polyurethane composite materials which have improved flame retardancy as compared to those polyurethane composite materials that are not made from phenolic polyols. Such polyurethane composite materials may also be fire and smoke resistance.

In other embodiments, the polyurethane composite materials are made from at least one acrylic polyol. In some embodiments, the polyurethane composite materials made from the at least one acrylic polyol demonstrate improved weathering as compared to those that are not made from at least one acrylic polyol. In other embodiments, the polyurethane composite materials are made from at least one acrylic polyol exhibit substantially no discoloration when exposed to sunlight.

In one embodiment, a first polyol having a first hydroxyl number and a second polyol having a second hydroxyl number less than the first hydroxyl number may be used. Such combination of polyols form a first polyurethane that is less rigid than a second polyurethane that would be formed by the reaction of the first polyol in the absence of the second polyol. In some embodiments, the first polyol has a hydroxyl number ranging from about 250 to about 500 mg KOH/g. In some embodiments, the first polyol has a hydroxyl number ranging from about 300 to about 450 mg KOH/g. In some embodiments, the first polyol has a hydroxyl number ranging from about 320 to about 400 mg KOH/g. In some embodiments, the first polyol has a hydroxyl number ranging from about 350 to about 500 mg KOH/g. In some embodiments, the first polyol has a hydroxyl number ranging from about 370 to about 600 mg KOH/g. In some embodiments, the second polyol has a hydroxyl number less than the first polyol. In some embodiments, the second polyol has a hydroxyl number ranging from about 20 to about 120 mg KOH/g. In some embodiments, the second polyol has a hydroxyl number ranging from about 20 to about 70 mg KOH/g. In some embodiments, the second polyol has a hydroxyl number ranging from about 30 to about 60 mg KOH/g. In some embodiments, the second polyol has a hydroxyl number ranging from about 50 to about 75 mg KOH/g. In some embodiments, the second polyol has a hydroxyl number ranging from about 40 to about 60 mg KOH/g. In some embodiments, the second polyol has a hydroxyl number ranging from about 30 to about 50 mg KOH/g.

For example, a first polyol such as Bayer's MULTRANOL 4500 may be used in combination with Bayer's ARCOL LG-56 and MULTRANOL 3900. In this case, the first polyol has a hydroxyl number ranging from 365-395 mg KOH/g. For ARCOL LG-56, the second polyol has a hydroxyl number ranging from 56.2 to 59.0 mg KOH/g. For MULTRANOL 3900 has a hydroxyl number ranging from 33.8 to 37.2 mg KOH/g. However, these examples are not intended to be limiting. Any number of polyol as described above may be selected for the hydroxyl number in controlling the flexibility or rigidity of a polyurethane product.

In one embodiment, mixture of polyols can be used to achieve the desired mechanical strength and rigidity of the final polyurethane composite material. In some embodiments, polyols with OH functionality between about 2 to about 7 can be used. In other embodiments, the average functionality of the polyols is between about 4 to about 7. The polyurethane composite materials become less expensive because the amount of isocyanate needed to react with the polyols to substantially form the desired polyurethane decreases. While this in some case may increase the rubberiness, non-brittleness, or flexibility of the polyurethane composite material, the correct balance of these functional polyols with OH functionality, between about 4 to about 8, maintains the mechanical properties of the polyurethane composite material, as compared to a polyurethane composite material made from polyols with an average functionality less than 4.

In some embodiments, the polyurethane composite material is made by using higher functional polyols in place of polyols having an average functionality of 2 or 3. In these embodiments, the polyurethane composite material has more cross linking. Some embodiments have higher impact strength, flexural strength, flexural modulus, chemical resistance, and water resistance as compared to the polyurethane composite material formed by polyols having a functionality of about 2 to about 3.

In some embodiments, the polyurethane composite material is made by using more than one polyol with different OH numbers to give the same weighted average OH number. Such polyurethane composite materials yield a more segmented polymer. By allowing many polyols of different functionality and/or molecular weight to be mixed together to make the needed OH number to balance the number of isocyanate groups, the orderliness of the resulting polymer chain is more segmented and less likely to align together. In some embodiments, the polyurethane composite material comprises three, four, five, or six types of polyols of different functionality and/or molecular weight. For example, a polyurethane system can be made from combination of multiple types of polyols, wherein at least one first polyol has an average functionality of about 2, wherein at least one second polyol has an average functionality of about 4, and wherein at least one third polyol has an average functionality of about 6. In one embodiment, the overall number of hydroxyl groups may be adjusted with varying polyols. In some embodiments, combinations of polyols with great number of hydroxyl groups may be blended with smaller quantities of polyols with less hydroxyl groups in order to produce a desired overall number of hydroxyl groups, which will react with the isocyanate.

In some embodiments, impact strength of the polyurethane composite material is greater than polyurethane composite materials comprising polyols of the same or substantially similar functionality and/or molecular weight. Although the two polyurethane compositions may comprise polyols with substantially similar average functionality and/or molecular weight, the polyurethane composition comprising polyols with substantially different functionality may exhibit improved mechanical properties such as impact strength. In some embodiments, polyurethane composite materials comprising polyols of multiple functionalities are more resistant to stress cracking.

Other embodiments of the polyurethane composite material are made from at least one polyol with a molecular weight from about 2000 to about 8000. These polyurethane composite materials exhibit an integral skin. In some embodiments, the skin is thicker. In other embodiments, the skin is less porous and harder. In some embodiments, the use of at least one polyol with a molecular weight from about 2000 to about 8000 results in the migration of the at least one polyol to migrate to the outer surface of the polyurethane composite material, thus allowing more outer skin to be formed.

In one embodiment, mixtures of two or more polyols may be used. In some embodiments, each polyol of a multi-polyol polyurethane system may be chosen for the various mechanical and chemical properties that result in the polyurethane composite produced as a result of using the polyol. For example, it is known to persons having ordinary skill in the art that polyols are often classified as rigid or flexible polyols based on various properties of the individual polyol and the overall flexibility of a polyurethane polymer produced from the respective polyols. Typically, the rigidity or flexibility of the polyurethane formed from any single polyol may be governed by one or more of the hydroxyl number, functionality, and molecular weight of the polyol. As such, one or more polyols with different characteristics may be used to control the physical and mechanical characteristics of the polyurethane composite material.

In one embodiment, the amount of rigid polyol is carefully controlled in order to avoid making the composite too brittle. In some embodiments, the weight ratio of rigid to flexible polyol ranges from about 0.5 to about 20. In other embodiments, the ratio of rigid to flexible polyol is about 1 to about 15. In other embodiments, the ratio of rigid to flexible polyol is about 4 to about 15. In other embodiments, the ratio of rigid to flexible polyol is about 3 to about 10. In other embodiments, the ratio of rigid to flexible polyol is about 6 to about 12.

If more than one polyol is used to form the polyurethane composition, mixtures of polyols can be used. In certain embodiments, the polyurethane is formed by reaction of a first polyol and a second polyol. In some of these embodiments, the first polyols has a functionality of at least three and a hydroxyl number of about 250 to about 800, and more preferably about 300 to about 400. In some embodiments, the first polyol hydroxyl number is about 350 to about 410. In some of these embodiments, the molecular weight of the first polyol ranges from about 200 to about 1000. In other embodiments, the molecular weight of the first polyol ranges from about 300 to about 600. In other embodiments, the molecular weight of the first polyol ranges from about 400 to about 500. Still, in some embodiments, the molecular weight of the first polyol is about 440.

A second polyol can be used which produces a less rigid polyurethane compared to a polyurethane produced if only the first polyol is used. In some embodiments, the second polyol has a functionality of about 3. In some embodiments, the functionality of the second polyol is not greater than three. In these embodiments, the second polyol can have a molecular weight of about 1000 to about 6000. In other embodiments, the second polyol has a molecular weight of about 2500 to about 5000. In some embodiments, the second polyol has a molecular weight of about 3500 to about 5000. In some embodiments, the molecular weight is about 4800. In other embodiments, the molecular weight of the second polyol is about 3000. In some of these embodiments, the second polyol has a hydroxyl number of about 25 to about 70, and more preferably about 50 to about 60.

Fillers

As discussed above, one or more filler materials may be included in the polyurethane composite material. In some embodiments, it is generally desirable to use particulate materials with a broad particle size distribution, because this provides better particulate packing, leading to increased density and decreased resin level per unit weight of composite. Since the inorganic particulate is typically some form of waste or scrap material, this leads to decreased raw material cost as well. In certain embodiments, particles having size distributions ranging from about 0.0625 inches to below 325 mesh have been found to be particularly suitable. In other embodiments, particles having size distribution range from about 5 µm to about 200 µm, and in another embodiment, from about 20 µm to about 50 µm.

Suitable inorganic particulates can include ground glass particles, fly ash, bottom ash, sand, granite dust, slate dust, and the like, as well as mixtures of these. Fly ash is desirable because it is uniform in consistency, contains some carbon (which can provide some desirable weathering properties to the product due to the inclusion of fine carbon particles which are known to provide weathering protection to plastics, and the effect of opaque ash particles which block UV light, and contains some metallic species, such as metal oxides, which are believed to provide additional catalysis of the polymerization reactions. Ground glass (such as window or bottle glass) absorbs less resin, decreasing the cost of the composite.

In general, fly ash having very low bulk density (e.g., less than about 40 lb/ft$^3$) and/or high carbon contents (e.g., around 20 wt % or higher) are less suitable, since they are more difficult to incorporate into the resin system, and may require additional inorganic fillers that have much less carbon, such as foundry sand, to be added. Fly ash produced by coal-fueled power plants, including Houston Lighting and Power power plants, fly and bottom ash from Southern California Edison plants (Navajo or Mohave), fly ash from Scottish Power/Jim Bridger power plant in Wyoming, and fly ash from Central Hudson Power plant have been found to be suitable for use in the invention.

Some embodiments of the polyurethane composite materials additionally comprise blends of various fillers. In some of these embodiments, the polyurethane composite materials exhibit better mechanical such as impact strength, flexural modulus, and flexural strength. One advantage in using blends of such systems is higher packing ability of blends of fillers. For example, a 1:1 mixture of coal fly ash and bottom ash has also been found to be suitable as the inorganic particulate composition.

Example in Table 1: The examples below were all mixed in a thermoset aromatic polyurethane system made with Hehr 1468 polyether polyol (15% of the total weight of the non-ash portion), water (0.2%), Air Products DC-197 (1.5%), Air Products 33LV amine catalyst (0.06%), Witco Fomrez UL28 tin catalyst (0.02%), and Hehr 1426A isocyanate (15%). 1.5× 3.5×24 inch boards were made.

TABLE 1

| Coal Ash Type | Ash % by Weight of Total Resin System | Density, lbs/cu ft | Flexural strength, psi | Flexural Modulus, Ksi |
|---|---|---|---|---|
| Mohave bottom ash | 65% | 70 | 1911 | 421 |
| Mohave bottom ash + Mohave fly ash (50/50) | 65% | 74 | 2349 | 466 |
| Mohave bottom ash | 75% | 68 | 930 | 266 |
| Mohave bottom ash + Mohave fly ash (50/50) | 75% | 79 | 2407 | 644 |
| Navajo bottom ash | 65% | 69 | 2092 | 525 |
| Navajo bottom ash + Navajo fly ash (50/50) | 65% | 74 | 2540 | 404 |
| Navajo bottom ash | 75% | 70 | 1223 | 377 |
| Navajo bottom ash + Navajo fly ash (50/50) | 75% | 84 | 2662 | 691 |

Thus, embodiments of the polyurethane composite material which comprise bottom and fly ash exhibit increased flexural strength and flexural modules as compared to polyurethane composite material comprising bottom ash alone. Some of these embodiments have a density of about 65 lbs/ft$^3$ to about 85 lbs/ft$^3$, including about 65, 67, 69, 71, 73, 75, 77, 79, 81, 83, or 85 lbs/ft$^3$.

In some of embodiments, the polyurethane composite material comprising about 65% ash filler of which about 32.5 wt % was bottom ash and about 32.5% was fly ash had a flexural strength of at least about 2300 psi, more preferably at least about 2400 psi, and even more preferably at least about 2500 psi. In some of embodiments, the polyurethane composite material comprising about 75% ash filler of which about 37.5 wt % was bottom ash and about 37.5% was fly ash had a flexural strength of at least about 2400 psi, more preferably at least about 2500 psi, and even more preferably at least about 2650 psi.

In some of embodiments, the polyurethane composite material comprising about 65% ash filler of which about 32.5 wt % was bottom ash and about 32.5% was fly ash had a flexural modulus of at least about 400 Ksi, more preferably at least about 440 Ksi, and even more preferably at least about 460 Ksi. In some of embodiments, the polyurethane composite material comprising about 75% ash filler of which about 37.5 wt % was bottom ash and about 37.5% was fly ash had a flexural modulus of at least about 640 Ksi, more preferably at least about 660 Ksi, and even more preferably at least about 690 Ksi.

In some embodiments, slate dust can be added to the polyurethane composite material to provide UV protection to the polyurethane composite material. Some of these embodiments additionally comprise one or more of pigments, light stabilizers, and combinations thereof. In some embodiments, polyurethane composite materials comprising slate dust exhibit substantially improved weathering. In some embodiments, the polyurethane composite material comprises a dust. A dust may be selected from at least one of slate dust, granite dust, marble dust, other stone-based dusts, and combinations thereof. In some embodiments, the polyurethane composite material comprises about 0.2 to about 70 wt % dust. In other embodiments, the polyurethane composite materials comprise about 10 to about 50 wt % of dust. In other embodiments, the polyurethane composite materials comprise about 20 to about 60 wt % of dust. In other embodiments, the polyurethane composite materials comprise about 30 to about 55 wt % of dust. In some embodiments, dust may be added to the composite material as additional filler. In this embodiment, the filler that is not dust may be present in the composite in amounts from about 10 to about 70 weight percent and the dust may be added in amounts of about 5 to about 35 weight percent.

The following is an example of a polyurethane composite material that comprises dust. The example should be in no way limiting, as other embodiments will be readily understood by a person having ordinary skill in the art.

Example from Table 2: In a blend of Cook Composites 5180 MDI (13.1% by weight), 5205 polyol (3.91%), Dow DER (1.98%), antimony trioxide flame retardant (3.52%), with Air Products DC-197 silicone surfactant (0.23%), benzoyl peroxide (0.55%), and chipped slate (59.5%), with the added pigments, carbon black and slate dust, all acting as UV inhibitors. The light exposure was to a high fusion (UV light) chamber at AlliedSignal Aerospace. Usually a 10 minute exposure in this chamber would deeply discolor this resin system due to the yellowing of the MDI-based ingredients in the resin system.

In the above test, clearly slate dust provided better light stability than coal ash, and the combination of slate dust plus carbon black provided the best UV resistance, and had not failed yet in the 20 minute test (the only sample to not fail). The effect of the slate dust was far more influential for UV stability then the various pigments tested, including carbon black plus fly ash.

In some embodiments, the polyurethane composite material composition comprises about 20 to about 95 weight percent of inorganic filler, which includes, for example, approximately 20, 25, 30, 35, 40, 42, 44, 46, 48, 50, 52, 54, 56, 58, 60, 62, 64, 66, 68, 70, 72, 74, 76, 78, 80, 82, 84, 86, 88, 90, 92, or 94 weight percent of filler. These amounts may be based on the total of all of the fillers, such as one or more of fly ash, dust, and fibrous material. However, the filler values may also be representative of only one type of filler, e.g, fly ash. In certain embodiments, the polymeric composite material may contain the filler in an amount within a range formed by the two of the foregoing approximate weight percent. In other embodiments, the polyurethane composite material comprises about 40 to about 85 weight percent of the filler. In other embodiments, the polyurethane composite material comprises about 55 to about 80 weight percent of the filler. In other embodiments, the polyurethane composite material comprises about 65 to about 85 weight percent of the filler. In other embodiments, the polyurethane composite material comprises about 40 to about 60 weight percent of the filler. In other embodiments, the polyurethane composite material comprises about 55 to about 70 weight percent of the filler. Here, the unit "weight percent" refers to the relative weight of the filler component compared to the total weight of the composite material.

Fibers

In some embodiments, reinforcing fibers can also be introduced into the polyol mixture prior to introduction of the isocyanate. In some embodiments, reinforcing fibers may be introduced after the at least one polyol and the isocyanate are mixed. These can include fibers per se, such as chopped fiberglass (chopped before or during mixing process such as extrusion), or fabrics or portions of fabrics, such as rovings or linear tows, or combinations of these. Typically, the reinforcing fibers range from about 0.125 in. to about 1 in, more particularly from about 0.25 in to about 0.5 in. The reinforcing fibers give the material added strength (flexural, tensile, and compressive), increase its stiffness, and provide increased toughness (impact strength or resistance to brittle fracture). Fabrics, rovings, or tows increase flexural stiffness and creep resistance. The inclusion of the particular polyurethane networks of the invention, together with the optional

TABLE 2

| Sample # (Numbers are purposely not in order) | Coal Fly Ash | Slate Dust | Red Iron Oxide Pigment, Cardinal Color Co. | Green Chromium Oxide Pigment, Cardinal Color Co. | Carbon Black, Chroma-Tek Co. | Time for Slight Change in Sheen or Slight Discoloration, minutes |
|---|---|---|---|---|---|---|
| 1 | 16.7% | — | | | | 10 |
| 2 | 16.7% | — | 0.58% | | | 10 |
| 3 | 16.6% | — | | 0.58% | | 10 |
| 4 | 16.7% | — | | | 0.58% | 10 |
| 5 | — | 16.6% | | | | 20 |
| 7 | — | 16.6% | 0.58% | | | 20 |
| 8 | — | 16.6% | | 0.58% | | 20 |
| 6 | — | 16.6% | | | 0.58% | 20+ (Test Ended) | surfactants, and the inorganic particulate sizes used make the composite of the invention particularly and surprisingly well suited for inclusion of reinforcing fibers in foamed material, which normally would be expected to rupture or distort the foam bubbles and decrease the strength of the composite system.

In addition to inclusion of reinforcing fibers into the polyol mixture prior to polymerization, oriented axial fibers can also be introduced into the composite after extrusion, as the polymer exits the extruder and prior to any molding. The fibers (e.g., glass strings) can desirably be wetted with a mixture of polyol (typically a higher molecular weight, rigid polyol) and isocyanate, but without catalyst or with a slow cure catalyst, or with other rigid or thermosetting resins, such as epoxies. This allows the wetted fiber to be incorporated into the composite before the newly added materials can cure, and allows this curing to be driven by the exotherm of the already curing polymer in the bulk material.

Whether added before or after polymerization and/or other mixing processing such as extrusion, the dispersed reinforcing fibers may be bonded to the polymeric matrix phase, thereby increasing the strength and stiffness of the resulting material. This enables the material to be used as a structural synthetic lumber, even at relatively low densities (e.g., about 20 to about 60 lb/ft$^3$).

According to certain embodiments, many types of fibers may be suitable for use in the polyurethane composite material. In some embodiments, the polyurethane composite materials comprise at least one of basalt, Wollastinite, other mineral fibers, or combinations thereof. In some embodiments, these components may be used in place of or in combination with glass fibers Example from Table 3: In a mixture of Hehr 1468 polyether polyol (500 grams), Hehr 1468 MDI (432 g), water (3 g), Air Products 33LV amine catalyst (1 g), Mohave coal fly ash (800 g), and the following reinforcing fibers, all made in 1.5×3.5×24 inch lumber samples:

TABLE 3

|  | Fiber Added | Flexural Strength, psi | Flexural Modulus, Ksi |
| --- | --- | --- | --- |
| None | — | 1239 | 68 |
| ¼ inch long chopped fiberglass | 1% | 1587 | 92 |
| " | 2.5% | 1436 | 91 |
| " | 5% | 1887 | 125 |
| ¼ inch long chopped basalt fiber | 1% | 2241 | 97 |
| " | 2.5% | 2646 | 131 |
| " | 5% | 3516 | 174 |
| Fiberglass + basalt (1.25% each) | 2.5% | 2732 | 135 |

In some embodiments, basalt fibers provide more flexural strength, and flexural modulus to the highly-filled polyurethane composite materials than fiberglass, and the combination of the two fibers gives a synergistic effect on both measured properties.

In some of embodiments, the polyurethane composite material comprising about 1.25% of chopped fiber glass and about 1.25% of basalt had a flexural strength of at least about 2650 psi, more preferably at least about 2700 psi, and even more preferably at least about 2730 psi.

Axial fibers or fabrics can also be added to the polyurethane composite material. These fiber and/or fabric typically increase the rigidity of the polyurethane composite material, and increase the mechanical strength. Using thicker fibers, rovings, tows, fabrics or rebar in the axial or stressed direction of the product can eliminate or reduce the tendency of the plastic to creep with time or higher temperature. These reinforcements also give higher initial tensile and flexural strength, and higher flexural and tensile stiffness of the polyurethane composite material. One advantage of using axial fibers or fabrics is that the fibers or fabrics are oriented in a direction that supports the polyurethane composite material. Unlike axial fibers, randomly chopped fibers are less structurally supportive.

In some embodiments, the axial fibers or fabrics may be added while dry (no resin on them). In other embodiments, the fibers or fabrics may be "wet" with resin when mixed with the polyurethane composite material. In some embodiments, the axial fibers or fabrics are added to the polyol and catalyst premix. In other embodiments, the axial fibers or fabrics are added to the isocyanate premix. Still, other embodiment may include adding the axial fibers of fabric together with a slow or delayed reaction polyol, catalyst, and isocyanate. Thus, the axial fibers can be added with multiple components of the polyurethane composite material.

In some embodiments, the axial fibers or fabrics may be added to the polyurethane composite material under tension, as is done with steel rebar in structural concrete. This provides additional strength in the tension direction, and in bending, as well as higher stiffness in the tension and bending directions.

Example in Table 4: Glass and basalt fibers were implanted in a highly-filled coal ash-thermosetting polyurethane mixture while still uncured, and the fibers laid lengthwise down the urethane in a box mold, and only on the top of the board (on one face). The fibers were laid in the urethane mixture about ⅛ inch below the surface of the mix, but frequently the fibers moved during the subsequent foaming and cure in the closed box mold, and sometimes showed on the board surface.

The flexural properties were unaffected by this fiber movement. The glass fibers from rovings were 0.755 g/ft, the basalt rovings from Ahlstrom (Canada) were 0.193 g/ft. The boards were 1.5×3.5×24 inches. During flexural testing the boards were tested so that the rovings were on the tensile side of the boards (not the compression side). Some of the rovings were pre-wetted with the same resin system as in the boards, but without the coal ash filler. The resin system was: Bayer Multranol 4035 polyether polyol (16.6% by weight), Bayer Multranol 3900 polyether polyol (5.5%), Air products DC-197 silicone surfactant (0.16%), water (0.07%), Witco Fomrez UL-28 tin catalyst (0.03%), Air Products 33LV amine catalyst (0.10%), Coal fly ash (49%), Bayer MRS4 MDI isocyanate (20.4%).

TABLE 4

| Fiber Type | Number of Rovings Inserted in Board, on 1 face, spread evenly on face | Wetted with Resin? | Total % Fiber on Board Weight | Board Density, lbs/cu ft | Flexural Strength, psi | Flexural Modulus, Ksi |
|---|---|---|---|---|---|---|
| None (Resin Alone) | — | — | — | 45 | 1319 | 82 |
| Glass | 10 | No | 0.77% | 32 | 2717 | 37 |
| " | 10 | Yes | 1.43% | 36 | 3533 | 77 |
| " | 10 | Yes, but pre-cured | 0.73% | 58 | 4000 | 188 |
| " | 20 | Yes | 2.72% | 35 | 4356 | 84 |
| Basalt fiber | 10 | No | 0.26% | 41 | 1191 | 73 |
| " | 40 | No | 0.79% | 49 | 2465 | 96 |

By wetting the glass fibers with uncured resin or cured resin, the boards are considerably stronger—even stronger than basalt reinforced boards with the same weight of fiber. By wetting the glass roving with polyurethane resin, the strength of the glass roving exceeds that of the unwetted basalt fiber.

In some embodiments, polyurethane composite materials comprising less than about 1.5 wt % of glass fiber rovings prewet with resin had a flexural strength of at least about 3500 psi and more preferably at least about 4000 psi. In embodiments wherein the prewet glass fiber rovings were procured with the polyurethane resin, the flexural strength was at least about 150 Ksi, and more preferably at least about 180 Ksi.

Chain Extenders & Cross Linkers

In some embodiments of the polyurethane composite material, low molecular weight reactants such as chain extenders or cross linkers provide a more polar area in the polyurethane composite material. These reactants allow the polyurethane system to more readily bind the inorganic filler and/or inorganic or organic fibers in the polyurethane composite material.

In some embodiments, the polyurethane composite material comprises one or more selected from chain extenders, crosslinkers, and combinations thereof. In some embodiments, the chain extenders can be selected one or more from the group comprising ethylene glycol, glycerin, 1,4-butane diol, trimethylolpropane, glycerol, or sorbitol. In some embodiments, at least one cross linker may be used to replace at least a portion of the at least one polyol in the polyurethane composite material. In some cases, this results in reduced costs of the overall product.

In some embodiments which comprise chain extenders, the mechanical properties of the polyurethane composite material are improved. In some embodiments, chain extenders are not blocked from reacting with the isocyanate by the filler. This is due to the molecular size of the chain extenders. In some embodiments, the chain extenders result in better mechanical properties as compared to polyurethane composite materials with high filler inorganic loads, which do not use chain extenders. These mechanical properties include flexural strength and modulus, impact strength, surface hardness, and scratch resistance.

In other embodiments, polyurethane composite material comprising chain extenders traps metals and metal oxides. This is advantageous in highly filled polyurethane composite materials when the filler is coal or other ashes, including fly ash and bottom ash, which can contain hazardous heavy metals. In some embodiments, the polyurethane composite material substantially prevents leaching of heavy metals in the polyurethane composite material.

In some embodiments, a highly filled polymer composition comprising chain extenders provides faster curing and less need for post-curing of the polyurethane composite materials. In some embodiments, the chain extenders provide better water resistance for the polyurethane composite material. These chain extenders include diamine chain extenders, such as MBOCA and DETDA. However, other embodiments of the polyurethane composite material may comprise glycol extenders.

Blowing Agents

Foaming agent may also be added to the reaction mixture if a foamed product is desired. While these may include organic blowing agents, such as halogenated hydrocarbons, hexanes, and other materials that vaporize when heated by the polyol-isocyanate reaction, it has been found that water is much less expensive, and reacts with isocyanate to yield $CO_2$, which is inert, safe, and need not be scrubbed from the process. In addition, $CO_2$ provides the type of polyurethane cells desirable in a foamed product (i.e., mostly closed, but some open cells), is highly compatible with the use of most inorganic particulate fillers, particularly at high filler levels, and is compatible with the use of reinforcing fibers.

If water is not added to the composition, some foaming may still occur due to the presence of small quantities of water (around 0.2 wt %, based on the total weight of the reaction mixture) introduced with the other components as an "impurity." Such water-based impurities may be removed by drying of the components prior to blending. On the other hand, excessive foaming resulting from the addition of too much water (either directly or through the introduction of "wet" reactants or inorganic particulate materials) can be controlled by addition of an absorbent, such as UOP "T" powder.

The amount of water present in the system will have an important effect on the density of the resulting composite material. This amount generally ranges from about 0.10 wt % to about 0.40 wt %, based on the weight of polyol added, for composite densities ranging from about 20 $lb/ft^3$ to about 90 $lb/ft^3$. However, polyurethane composite material densities may be controlled by varying one or more other components as well. In some embodiments, the overall density of the polyurethane composite material may range from about 30 $lb/ft^3$ to about 80 $lb/ft^3$. In some embodiments, the overall density of the polyurethane composite material may range from about 40 $lb/ft^3$ to about 60 $lb/ft^3$.

In some embodiments, the addition of excess blowing agent or water above what is needed to complete the foam reaction adds strength and stiffness to the polyurethane composite material, if the material is restrained during the forming of the composite material. Typically, excess blowing agent may be added to the polyol premixture. Such excessive blowing agent may produce a vigorously foaming reaction product. To contain such reaction product, a forming device that contains the pressure or restrains the materials from expanding may be used. Such forming devices are further described herein. The restraint of the material or the higher pressure created by a mold or restraining forming belts, causes higher pressure within the material which modifies the foam cell structure, thus allowing higher mechanical properties of the resulting cured material.

According to certain embodiments, use of excess blowing agent in formation of the polyurethane composite material may also improves the water resistance of the polyurethane composite material. In some embodiments, use of excessive blowing agent may also increase the thickness and durability of the outer skin of the self skinning polyurethane composite material.

Solvents

The addition of solvents to the reaction mixture may also provide certain advantages. In some embodiments of the polyurethane composite materials, solvents can be added to the polyol premix prior to or during the formation of the polyurethane. While it is described that solvents are added to the polyol premix, solvents may also be added at other stages of mixing of various components of the polyurethane composite material. In some embodiments, the solvent may be added with any one or more components of the reaction mixture which produces the polyurethane composite material.

In some embodiments, addition of a solvent to a polyol premix results in a polyurethane composite material that is more scratch and mar resistance as compared to the same polyurethane composition made without the solvent added to the polyol premix. Additional properties that result in some embodiments include a harder skin. In addition, solvents may cause a higher concentration of resin material to be in the self skinning layer, as opposed to the fillers and reinforcing fibers. In some materials, this provides a polyurethane composite material having a higher concentration of ultraviolet stabilizers, antioxidants, and other additives are closer to the outside of the composite material. In some embodiments, use of solvent produces a polyurethane composite material with an increases skin thickness. In other embodiments, the skin density may also be increased. Still, in other embodiments, the addition of solvents may decrease the interior density of the polyurethane composite material.

In some embodiments, the addition of solvent to the polyol premix substantially improves the weathering of the polyurethane composite material due to the higher density and thickness of the outer skin, which can contain more concentrated antioxidants, pigments, fillers and UV inhibitors. In other embodiments, the addition of the solvent to the polyol premix substantially prevents discoloration of the polyurethane composite material when a sample of the material is exposed to sunlight or UV radiation. In other embodiments, the addition of the solvent to the polyol premix provides a polyurethane composite material (upon mixing of the rest of the components) which has improved anti-static properties.

For example, the addition of about 2 to about 10 wt % of a solvent selected from the group consisting of a hydrocarbon solvent (pentane, hexane), carbon tetrachloride, trichloroethylene, methylene chloride, chloroform, methyl chloroform, perchloroethylene, or ethyl acetate to a polyol premix, the resulting self-skinning polyurethane composite material has a thicker skin as compared to polyurethane composite materials which are not create by the addition of a solvent to the polyol premix. As a result, the outer skin is much thicker, including greater than about 100, 200, 500, and about 1500% thicker as compared to a polyurethane made without adding solvent to the polyol premix. In some embodiments, the polyurethane composite material made by the addition of solvent to the polyol premix may have an increase outer density skin, thus making the skin harder, where the skin is greater than about 50, 75 and about 150% harder as compared to a polyurethane made without adding the solvent to the polyol premix. Furthermore, some embodiments of the polyurethane composite material have an interior density that is less than between about 10 and about 50% as compared as compared to a polyurethane made without adding the solvent to the polyol.

Additional Components

The polyurethane composite materials can contain one or more compounds or polymers in addition to the foregoing components. Additional components or additives may be added to provide additional properties or characteristics to the composition or to modify existing properties (such as mechanical strength or heat deflection temperature) of the composition. For example, the polyurethane composite material may further include a heat stabilizer, an anti-oxidant, an ultraviolet absorbing agent, a light stabilizer, a flame retardant, a lubricant, a pigment and/or dye. One having ordinary skill in the art will appreciate that various additives may be added to the polymer compositions according to embodiments of the invention. Some of these additional additives are further described herein.

UV Light Stabilizers, Antioxidants, Pigments

Ultraviolet light stabilizers, such as UV absorbers, can be added to the polyurethane composite material prior to or during its formation. Hindered amine type stabilizers, and opaque pigments like carbon black powder, can greatly increase the light stability of plastics and coatings. In some embodiments, phenolic antioxidants are provided. These antioxidants provide increased UV protection, as well as thermal oxidation protection.

In some embodiments, the polyurethane composite material comprises one or more selected from the group consisting of light stabilizers and antioxidants. In combination, the light stabilizers and antioxidants provide a synergistic effect of reducing the detrimental effects of UV light as compared to either component used alone in the polyurethane composite material. According to certain embodiments, the effect is non-additive.

For example, in aromatic thermosetting polyurethanes, using 0.5 wt % Tinuvin 328 light absorber alone provides some resistance to UV, such as reduced yellowing, less chalking, and less embrittlement. Adding Irganox 1010 antioxidant at 0.5 wt % greatly improves the resistance to UV, and even using 0.2 wt % of each provides better stability than either of the stabilizers at 0.5 wt % alone.

Pigment or dye can be added to the polyol mixture or can be added at other points in the process. The pigment is optional, but can help make the composite material more commercially acceptable, more distinctive, and help to hide any scratches that might form in the surface of the material. Typical examples of pigments include iron oxide, typically added in amounts ranging from about 2 wt % to about 7 wt %, based on the total weight of the reaction mixture.

Surfactants and Catalysts

One or more catalysts are generally added to control the curing time of the polymer matrix (upon addition of the isocyanate), and these may be selected from among those known to initiate reaction between isocyanates and polyols, such as amine-containing catalysts, such as DABCO and tetramethylbutanediamine, tin-, mercury- and bismuth-containing catalysts. To increase uniformity and rapidity of cure, it may be desirable to add multiple catalysts, including a catalyst that provides overall curing via gelation, and another that provides rapid surface curing to form a skin and eliminate tackiness. For example, a liquid mixture of 1 part tin-containing catalyst to 10 parts amine-containing catalyst can be added in an amount greater than 0 wt % and below about 0.10 wt % (based on the total reaction mixture) or less, depending on the length of curing time desired. Too much catalyst can result in overcuring, which could cause buildup of cured material on the processing equipment, or too stiff a material which cannot be properly shaped, or scorching; in severe cases, this can lead to unsaleable product or fire. Curing times generally range from about 5 seconds to about 2 hours.

A surfactant may optionally be added to the polyol mixture to function as a wetting agent and assist in mixing of the inorganic particulate material. The surfactant also stabilizes and controls the size of bubbles formed during foaming (if a foamed product is desired) and passivates the surface of the inorganic particulates, so that the polymeric matrix covers and bonds to a higher surface area. Surfactants can be used in amounts below about 0.5 wt %, desirably about 0.3 wt %, based on the total weight of the mixture. Excess amount of surfactant can lead to excess water absorption, which can lead to freeze/thaw damage to the composite material. Silicone surfactants have been found to be suitable for use in the invention. Examples include DC-197 and DC-193 (silicone-based, Air Products), and other nonpolar and polar (anionic and cationic) products.

Other Additives

In some embodiments, the filled polyurethane composite material additionally comprises at least one coupling agent. Coupling agents and other surface treatments such as viscosity reducers or flow control agents can be added directly to the filler or fiber, and incorporated prior to, during, and after the mixing and reaction of the polyurethane composite material. In some embodiments, the polyurethane composite materials comprise pre-treated fillers and fibers.

In some embodiments, the coupling agents allow higher filler loadings of an inorganic filler such as fly ash. In embodiments, these ingredients may be used in small quantities. For example, the polyurethane composite material may comprises about 0.01 wt % to about 0.5 wt % of at least one coupling agent. In some of these embodiments, the polyurethane composite materials exhibit greater impact strength, as well as greater flexural modulus and strength, as compared to those materials without at least one coupling agent. Coupling agents reduce the viscosity of the resin/filler mixture. In some embodiments, coupling agents increase the wetting of the fibers and fillers by the resin components during the mixing the components.

In other embodiments, coupling agents reduce the need for colorants by improving the dispersion of the colorants, and the break up of colorant clumps. Thus, the polyurethane composite material which comprises coupling agents and a colorant may exhibit substantially uniform coloration throughout the polyurethane composite material.

Example in Table 5: The following flow control agents were tested in a urethane polyol with a high loading of filler, such that the combination would flow through a Zahn #5 cup viscometer. The polyol was Bayer Multranol 4035 polyether used at 70 g, with 30 g of two different fillers—tested separately. The polyol+filler were hand mixed and put into the Zahn Cup with the bottom port closed with tape. When the Zahn cup was full, the tape was removed and the time for the mixture to flow out of the Cup was measured. All tests at 65° F. (18° C.). The agents were: Air Products DABCO DC197 silicone-based surfactant, Kenrich Petrochemicals Ken-React LICA 38, and Ken-React KR 55 organo-titanates, Shin-Etsu Chemical KBM-403 organo-silane.

These tests show that even 0.1% of the flow control agent on the weight of the filler can markedly improve the flow of the mixture. This flow improvement allows higher levels of filler to be used in urethane mixtures, better wetting of the filler by the polyol, and more thorough mixing of all the components. The DC-197 surfactant works well, but only at much higher concentrations.

TABLE 5

| Filler Type | Flow Improver | Flow Improver Weight, grams | Time to Flow out of #5 Zahn Cup, & stop dripping, seconds | % Improvement (Faster Flow) Over Control |
|---|---|---|---|---|
| Ground waste bottle glass | None (Control) | — | 60 | — |
| Ground waste bottle glass | KBM 403 | 0.14 | 50 | 15% |
| Ground waste bottle glass | KBM 403 0.51 g + DC-197 0.83 g | 1.34 | 53 | 18% |
| Ground waste bottle glass | KBM 403 0.15 g + DC-197 0.60 g | 0.75 | 56 | 7% |
| Ground waste bottle glass | DC-197 | 0.67 | 50 | 13% |
| Cinergy fly ash | None (Control) | — | 46 | — |
| " | KBM 403 | 0.21 | 38 | 17% |
| " | KR 55 | 0.06 | 41 | 11% |
| " | LICA 38 | 0.04 | 42 | 13% |
| " | KBM 403 | 0.03 | 40 | 16% |

Ratios of the Components Used to Make the Polyurethane Composite Material

Variations in the ratio of the at least one polyol to the isocyanate have various changes on the overall polyurethane product and the process for making the polyurethane composites with high inorganic filler loads. High filler in such systems typically inhibit or physically block the reaction or action of the various polyurethane composite components, including the at least one polyol, the di- or polyisocyanate, the surfactants, flow modifiers, cell regulators and the catalysts. In addition, the heat that is released during the course of the exothermic reaction in forming the polyurethane composite is much higher in an unfilled polyurethane system. A larger isocyanate index gives higher temperature exotherms during the process of making the polyurethane composite material. By adding, 5 to 20 wt % excess, and more preferably 5 to 10 wt % excess, of the isocyanate to the otherwise chemically balanced at least one polyol that may comprise chain extenders with additional OH groups (thus, measuring the balance by the overall OH numbers).

Higher temperature exotherms result in more cross linking of the polyol and isocyanate, and/or a more complete reaction of the hydroxyl groups and isocyanate groups. In some embodiments, a higher isocyanate index also causes much higher cross link densities. In other embodiments, the higher isocyanate index provides a more "thermoset" type of polyurethane composite. In other embodiments, the higher isocyanate index provides a polyurethane with a more chemically resistant polyurethane composite material when exposed to chemicals. In some cases, these chemicals are solvents and water. In certain embodiments, the higher isocyanate index provides a polyurethane composite system with a higher heat distortion temperature. The heat distortion temperature or its effects may be determined by elevated temperature creep tests, standard ASTM heat distortion testing, surface hardness variations with increased temperature, for example, in an oven, and changes in mechanical properties at increasing temperature.

Representative suitable compositional ranges for synthetic lumber, in percent based on the total composite composition, are provided below:

At least one polyol: about 6 to about 28 wt %
Surfactant: about 0.2 to about 0.5 wt %
Skin forming catalyst about 0.002 to about 0.01 wt %
Gelation catalyst about 0.02 to about 0.1 wt %
Water 0 to about 0.5 wt %
Chopped fiberglass (optional) about 0.1 to about 10 wt %
Pigments (optional) 0.1 to about 6 wt %
Inorganic particulates about 60 to about 85 wt %
Isocyanate about 6 to about 20 wt %
Axial tows (optional) 0.1 to about 6 wt %.

Additional components described herein can be added in various amounts. Such amount may be determined by persons having ordinary skill in the art.

Mixing and Reaction of the Components of the Polyurethane Composite Material

The polyurethane composite material can be prepared by mixing the various components described above including the isocyanate, the polyol, the catalyst, the inorganic filler, and various other additives. In some embodiments, one or more other additives may be mixed together with the components of the polyurethane composition. One or more component resins can be heated to melt prior to the mixing or the composition may be heated during the mixing. However, the mixing can occur when each components is in a solid, liquid, or dissolved state, or mixtures thereof. In one embodiment, the above components are mixed together all at once. Alternatively, one or more components are added individually. Formulating and mixing the components may be made by any method known to those persons having ordinary skill in the art, or those methods that may be later discovered. The mixing may occur in a pre-mixing state in a device such as a ribbon blender, followed by further mixing in a Henschel mixer, Banbury mixer, a single screw extruder, a twin screw extruder, a multi screw extruder, or a cokneader.

In some preferred embodiments, the polyurethane composite material can be prepared by mixing the polyols together (if multiple polyols are used), and then mixing them with various additives, such as catalysts, surfactants, and foaming agent, and then adding the inorganic particulate phase, then any reinforcing fiber, and finally the isocyanate. While mixing of some of the components can occur prior to extrusion, all of the components may alternatively be mixed in a mixer such as an extruder.

In one embodiment, it has been found that this order of blending results in the manufacture of polyurethane composite materials suitable for building material applications. Thus, it has been discovered that the order of mixing, as well as other reaction conditions may impact the appearance and properties of the resulting polyurethane composite material, and thus its commercial acceptability.

One particular embodiment relates to a method of producing a polymer matrix composite, by (1) mixing a first polyol and a second polyol with a catalyst, optional water, and optional surfactant; (2) optionally introducing reinforcing fibrous materials into the mixture; (3) introducing inorganic filler into the mixture; (4) introducing poly- or di-isocyanate into the mixture; and (5) allowing the exothermic reaction to proceed without forced cooling except to control runaway exotherms.

The process for producing the composite material may be operated in a batch, semibatch, or continuous manner. Mixing may be conducted using conventional mixers, such as Banbury type mixers, stirred tanks, and the like, or may be conducted in an extruder, such as a twin screw, co-rotating, extruder. When an extruder is used, additional heating is generally not necessary, especially if liquid polyols are used. In addition, forced cooling is not generally required, except for minimal cooling to control excessive or runaway exotherms.

For example, a multi-zone extruder can be used, with polyols and additives introduced into the first zone, inorganic particulates introduced in the second zone, and chopped fibers, isocyanate, and pigments introduced in the fifth zone. A twin screw, co-rotating, extruder (e.g. 100 mm diameter, although the diameter can be varied substantially) can be used, with only water cooling (to maintain substantially near room temperature), and without extruder vacuum (except for ash dust). Liquid materials can be pumped into the extruder, while solids can be added by suitable hopper/screw feeder arrangements. Internal pressure build up in such an exemplary arrangement is not significant.

Although gelation occurs essentially immediately, complete curing can take as long as 48 hours, and it is therefore desirable to wait at least that long before assessing the mechanical properties of the composite, in order to allow both the composition and the properties to stabilize.

In some embodiments, the process of forming the highly filled polyurethane composite material comprises providing the components of the polyurethane composite material, mixing the components together, extruding the components through a die, adding any other additional components after the extrusion, and forming a shaped article of the polyurethane composite material. As the polyurethane composite material exits the die, the composite material may be placed in a mold for post-extrusion curing and shaping. In one embodiment, the composite material is allowed to cure in a box or bucket.

In one embodiment the formation of the shaped articles comprises injecting the extruded polyurethane composite material in a mold cavity and curing the shaped article. However, some embodiments require that the extruded polyurethane composite material be placed in a mold cavity secured on all sides, and exerting pressure on the polyurethane composite material. In some of these embodiments, the polyurethane composite material will be foaming or will already be foamed. However, it is preferred that the material is placed under the pressure of the mold cavity prior to or at least during at least some foaming of the polyurethane composite material.

A shaped article can be made using the polyurethane composite materials according to the foregoing embodiments. In some embodiments, this article is molded into various shapes. In some embodiments, the polyurethane composite material is extruded, and then injected into a continuous production system. Suitable systems for forming the composite materials of some embodiments are described in U.S. patent application Ser. No. 10/764,013 filed Jan. 23, 2004 and entitled "CONTINUOUS FORMING SYSTEM UTILIZING UP TO SIX ENDLESS BELTS," now published as U.S. Patent Application Publication No. 2005-0161855-A1, and U.S. patent application Ser. No. 11/165,071, filed Jun. 23, 2005, entitled "CONTINUOUS FORMING APPARATUS FOR THREE-DIMENSIONAL FOAMED PRODUCTS," now published as U.S. Patent Application Publication No. 2005-0287238-A1, both of which are hereby incorporated by reference in their entireties.

The polyurethane composite material of certain embodiments may exert certain pressures on the walls of any mold, such as that found in the forming devices as described above. While the amount of pressure may vary according to the amount of foaming and gas production, it is preferred that such forming devices may exert or hold pressures by the mold cavity ranging from about 35 to about 75 psi. In some embodiments, the pressure is from about 45 to about 65 psi. In some embodiments, the pressure is about 50 psi. However, mold pressures in any embodiment of a method of making the polyurethane composite material can be higher than or less than the specified values. The exact pressure required in the formation of the desired shaped article depends on the density, color, size, shape, physical properties, and the mechanical properties of the article comprising the polyurethane composite material.

When foaming polyurethane is formed by belts into a product shape, the pressure that the foamed part exerts on the belts is related to the resulting mechanical properties. For example, as the pressure of the foaming increases and the belt system can hold this pressure without the belts separating, then the product may have higher flexural strength, then if the belts allowed leaking, or pressure drop. In some embodiments, pressures about 50 to about 75 psi have been used to obtain high mechanical properties in the polyurethane composite material. In one example, an increase in the flexural strength of 50 psi results from the higher pressure in the belts, versus using a lower pressure.

In some embodiments, a shaped article comprising the polyurethane composite material as described herein is roofing material such as roof tile shingles, etc., siding material, carpet backing, synthetic lumber, building panels, scaffolding, cast molded products, decking materials, fencing materials, marine lumber, doors, door parts, moldings, sills, stone, masonry, brick products, post, signs, guard rails, retaining walls, park benches, tables, slats and railroad ties.

Other shaped articles may comprise a portion of which comprises the polyurethane composite material. In some embodiments, the polyurethane composite material is coated or molded on one side of an article. For example, the polyurethane composite material may be coated or molded onto one side of a flat or S-shaped clay roof tile, which has been cut or molded thinner than normal, and laid on a conveyor belt, followed by extrusion of the polyurethane composite material onto at least a portion of the tile. Such portion may be shaped by a mold which is adapted to shape the polyurethane composite material deposited on the tile. For example, the forming unit may operate with two mold belts which are adapted to shape the polyurethane composite material on one side of the portion. In some embodiments, the composite material may provide backing to an article. In one embodiment, the composite material may be foamed sufficient to provide insulation to an article.

In some embodiments, the polyurethane composite material can reinforce an article. For example, by placing a coating or molding of the polyurethane composite material on a roof tile, the impact strength of the roof tile is increased. Thus one embodiment comprises a method of substantially reducing the fracture of an article by depositing the polyurethane composite on a solid surface article, shaping the composite on the solid surface article by methods described herein, and curing the composite on the solid surface article. Such method may produce a one or more of a reinforced, backed, or insulated article. Such article may also have increased physical and mechanical properties. Additionally, a reinforcing layer may be used to prevent water weeping, and increases the overall thickness of a solid surface article.

In some embodiments, the polyurethane composite material can bond directly to an article solid surface article such as a tile. Alternatively, an adhesive can be applied to the solid surface article and a shaped polyurethane composite article can be attached thereto. A solid surface article such as a tile may include at least one or more of cement, slate, granite, marble, and combinations thereof, and the polyurethane composite material as described in embodiments herein. Such tiles may be used as roofing or siding tiles.

In some embodiments, the composite material may be used as reinforcement of composite structural members including building materials such as doors, windows, furniture and cabinets and for well and concrete repair. In some embodiments, the composite material may be used to fill any unintended gaps, particularly to increase the strength of solid surface articles and/or structural components. Structural components may formed from a variety of materials such as wood, plastic, concrete and others, whereas the defect to be repaired or reinforced can appear as cuts, gaps, deep holes, cracks.

Optional Additional Mixing Process

One of the most difficult problems in forming polyurethane composite materials which have large amounts of filler is getting intimate mixing—blending the polyols and the isocyanate. In some embodiments, an ultrasound device may be used to cause better mixing of the various components of the polyurethane composite material. In these embodiments, the ultrasound mixing may also result in the enhanced mixing and/or wetting of the components. In some embodiments, the enhanced mixing and/or wetting allows a high concentration of filler, such as coal ash to be mixed with the polyurethane matrix, including about 40, 50, 60, 70, 80, and about 85 wt % of the inorganic filler.

In some embodiments, the ultrasound device produces an ultrasound of a certain frequency. In some embodiments, the frequency of the ultrasound device is varied during the mixing and/or extrusion process. In some embodiments, the components are mixed in a continuous mixer, such as an extruder, equipped with an ultrasound device. In some embodiments, an ultrasound device is attached to or is adjacent to the extruder and/or mixer. In other embodiments, an ultrasound device is attached to the die of the extruder. In other embodiments, the ultrasound device is placed in a port of the extruder or mixer. In further embodiments, an ultrasound device provides vibrations at the location where the isocyanate and polyol meet as the screw delivers the polyol to the isocyanate.

In addition, an ultrasound device may provide better mixing for the other components, such as blowing agents, surfactants, catalysts. In embodiments where additional components are added to the polyol prior to mixing the polyol with the isocyanate, the additional components are also exposed to ultrasound vibration. In some embodiments, an ash selected from fly ash, bottom ash, or combinations thereof, is mixed using an ultrasound device. In some embodiments, ultrasound vibrations breaks up filler and fiber bundles to allow more thorough wetting of these components to provide a polyurethane composite material with better mechanical properties, such as flexural modulus and flexural strength, as compared to polyurethane composite materials which are created without the use of ultrasound vibration. The wetting of fibers and fillers could also be increased by the use of ultrasound at or near the die of the extruder, thus forcing resin to coat the fibers and fillers better, and even breaking up fiber bundles and filler lumps. The sound frequency and intensity would be adjusted to give the best mixing, and what frequency is best for the urethane raw materials, may not be best for the filler and fibers. In another embodiment, one or more of the components may be preblended in a mixer, such as a high shear mixer.

Unless otherwise noted, all percentages and parts are by weight.

The skilled artisan will recognize the interchangeability of various features from different embodiments. Similarly, the various features and steps discussed above, as well as other known equivalents for each such feature or step, can be mixed and matched by one of ordinary skill in this art to perform compositions or methods in accordance with principles described herein. Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of embodiments herein. Rather, the scope of the present invention is to be interpreted with reference to the claims that follow.

What is claimed is:

1. A method of forming a polyurethane composite material, the method comprising:
    providing at least a first polyol having first hydroxyl number in the range of about 320 mg KOH/g to about 600 mg KOH/g; and
    providing at least a second polyol having a second hydroxyl number which is at least about 20 mg KOH/g and is less than the first hydroxyl number;
        wherein the ratio of first polyol to second polyol is about 3 to about 80;
        wherein the first polyol and the second polyol are plant based polyester polyols; and
        wherein the first polyol and the second polyol, when mixed together, have a viscosity of about 1500 cP or less at 20° C.;
    providing at least one poly or di-isocyanate;
    providing an inorganic filler;
    providing a blowing agent consisting essentially of about 0.1 wt % to about 0.4 wt % water based upon the weight of the composite material; and
    mixing the first polyol, the second polyol, and the poly or di-isocyanate, the inorganic filler, and the blowing agent to form a reaction mixture, and extruding the reaction mixture into an extruded, foaming mixture; and
    containing the extruded mixture in a mold; and
    allowing the composite material to cure in the mold;
    wherein substantially no halogenated hydrocarbons are added;
    wherein the composite material comprises about 60 to about 85 weight percent of an the inorganic filler; and
    wherein the composite material has a density in the range of about 30 lb/ft$^3$ to about 80 lb/ft$^3$.

2. The method of claim 1, wherein the weight ratio of the first polyol to the second polyol is about 4 to about 10.

3. The method of claim 1, wherein the weight ratio of the first polyol to the second polyol is about 5 to about 8.

4. The method of claim 1, wherein the extruded material comprises about 65 to about 75 weight percent of the inorganic filler.

5. The method of claim 1, wherein the inorganic filler comprises fly ash.

6. The method of claim 1, further comprising extruding a catalyst with the composite material.

7. The method of claim 6, wherein the catalyst is blended with the first and second polyols prior to mixing in the extruder.

8. A method of coating a solid surface article, the method comprising:
    depositing a polyurethane composite material on a solid surface article, the polyurethane composite material comprising:
        a reaction product of at least a first polyol, a second polyol, at least one di- or poly-isocyanate, and less than about 0.4% water by weight; and
        about 60 to about 85 weight percent of an inorganic filler;
        wherein the first polyol and the second polyol are plant-based polyester polyols;
        wherein the ratio of the first polyol to the second polyol is about 3 to about 80;
    shaping the polyurethane composite material on the solid surface article in a mold so that the material is restrained from expanding;
    wherein substantially no halogenated hydrocarbons are added; and
    curing the polyurethane composite material on the solid surface article;
    wherein the composite material has a density in the range of about 30 lb/ft$^3$ to about 80 lb/ft$^3$.

9. The method of claim 8, wherein the solid surface article is a tile.

10. The method of claim 8, wherein the inorganic filler comprises fly ash.

11. The method of claim 8, wherein the polyurethane composite material comprises about 65 to about 75 weight percent of the inorganic filler.

* * * * *

UNITED STATES PATENT AND TRADEMARK OFFICE
CERTIFICATE OF CORRECTION

| | | |
|---|---|---|
| PATENT NO. | : 8,138,234 B2 | Page 1 of 1 |
| APPLICATION NO. | : 11/691451 | |
| DATED | : March 20, 2012 | |
| INVENTOR(S) | : Wade H. Brown | |

It is certified that error appears in the above-identified patent and that said Letters Patent is hereby corrected as shown below:

Column 4, Line 16 Change "material," to --material.--.

Column 6, Line 11 (Approx.) Change "Temprature)," to --temperature),--.

Column 6, Line 11 (Approx.) Change "polyoxpropylene" to --polyoxypropylene--.

Column 6, Line 23 (Approx.) Change "ethylendiamine" to --ethylenediamine--.

Column 6, Line 26 (Approx.) Change "1,3-buytylene" to --1,3-butylene--.

Column 12, Line 16 Change "e.g," to --e.g.,--.

Column 13, Line 33 Change "Wollastinite," to --Wollastonite,--.

Column 13, Line 36 (Approx.) Change "fibers" to --fibers.--.

Column 24, Line 7 Change "thereof," to --thereof;--.

Column 25, Line 25 Change "having first" to --having a first--.

Column 26, Line 2 In Claim 1, change "an the" to --the--.

Signed and Sealed this
Twentieth Day of November, 2012

David J. Kappos
*Director of the United States Patent and Trademark Office*